US009801113B2

United States Patent
Baker et al.

(10) Patent No.: US 9,801,113 B2
(45) Date of Patent: Oct. 24, 2017

(54) COLLECTION SYSTEM WITH A HYBRID NODE PERFORMING BOTH FIXED NETWORK AND MOBILE COMMUNICATIONS

(71) Applicant: Elster Solutions, LLC, Raleigh, NC (US)

(72) Inventors: Marvin C. Baker, Wake Forest, NC (US); Stephen S. Makgill, Jr., Raleigh, NC (US); D. Mark Holman, Curham, NC (US); Roberta Yee, Raleigh, NC (US); Peter J. Higgins, Chapel Hill, NC (US)

(73) Assignee: Elster Solutions, LLC, Raleigh, NC (US)

( * ) Notice: Subject to any disclaimer, the term of this patent is extended or adjusted under 35 U.S.C. 154(b) by 939 days.

(21) Appl. No.: 13/716,356

(22) Filed: Dec. 17, 2012

(65) Prior Publication Data

US 2014/0141711 A1    May 22, 2014

Related U.S. Application Data

(60) Provisional application No. 61/727,552, filed on Nov. 16, 2012.

(51) Int. Cl.
*H04W 40/02* (2009.01)
*H04W 88/06* (2009.01)

(52) U.S. Cl.
CPC .......... *H04W 40/02* (2013.01); *H04W 88/06* (2013.01); *Y02B 60/50* (2013.01)

(58) Field of Classification Search
CPC .......... G01D 4/002; G01D 4/00; G01D 4/004; G01D 4/006; G01D 4/02; H04W 40/02;

(Continued)

(56) References Cited

U.S. PATENT DOCUMENTS 6,246,677 B1 * 6/2001 Nap ...................... G01D 4/004
340/870.02
7,283,062 B2    10/2007 Hoiness
(Continued)

FOREIGN PATENT DOCUMENTS

IL           145737    * 10/2001   ............. G01D 4/006
WO    WO2011002622 A3    4/2012

OTHER PUBLICATIONS

ARB® Utility Manaagement Systems™ for Water Utilities, Neptune Technology Group, Paper, 2006.
(Continued)

*Primary Examiner* — Quan-Zhen Wang
*Assistant Examiner* — Stephen Burgdorf
(74) *Attorney, Agent, or Firm* — Baker & Hostetler LLP

(57) ABSTRACT

A mobile interrogator can be used in a system for hybrid employment of fixed network and mobile network communications. The system includes communication nodes. At least some of the communication nodes operate in a fixed network mode using one or more fixed wireless network communication protocols. At least some other of the communication nodes operate in a mobile mode in which they transmit meter data to a mobile device using one or more mobile communication protocols. The mobile device is configured to communicate with the mobile mode communication nodes using the one or more mobile communication protocols and to communicate with the fixed network mode communication nodes using the one or more fixed wireless network communication protocols. As a result, the performance of both fixed and mobile networks can be improved. A hybrid system can be realized that provides a utility company with advantages of both fixed and mobile networks.

8 Claims, 11 Drawing Sheets

(58) Field of Classification Search
CPC ... H04W 88/06; Y02B 90/246; Y02B 90/243; Y04S 20/42; Y04S 20/325; G08C 17/00; H04L 29/06; H04L 67/125; H04M 11/002; H04Q 9/00; H04Q 2209/40; H04Q 2209/50; H04Q 2209/60
USPC ............ 340/870.01, 870.02, 870.07, 870.03; 370/401, 310, 466; 379/106.03; 455/11.1, 414.1, 500
See application file for complete search history.

(56) References Cited

U.S. PATENT DOCUMENTS

| | | | |
|---|---|---|---|
| 7,362,236 B2 | 4/2008 | Hoiness | |
| 7,479,895 B2 | 1/2009 | Osterloh et al. | |
| 8,027,282 B2 | 9/2011 | Boehnke et al. | |
| 8,242,931 B2 | 8/2012 | Holman | |
| 2003/0174067 A1* | 9/2003 | Soliman | G01D 4/004 340/870.02 |
| 2005/0184882 A1* | 8/2005 | Angelis | H04Q 9/00 340/870.02 |
| 2005/0237959 A1 | 10/2005 | Osterloh et al. | |
| 2008/0158007 A1* | 7/2008 | Nagy | G07F 15/00 340/870.03 |
| 2008/0219210 A1 | 9/2008 | Shuey et al. | |
| 2009/0102681 A1* | 4/2009 | Brennan, Jr. | G01D 4/004 340/870.03 |
| 2009/0146838 A1 | 6/2009 | Katz | |
| 2009/0267792 A1* | 10/2009 | Crichlow | G01D 4/004 340/870.02 |
| 2010/0142448 A1* | 6/2010 | Schlicht | H04W 4/20 370/328 |
| 2010/0150120 A1 | 6/2010 | Schlicht | |
| 2011/0004764 A1* | 1/2011 | Stuber | G01D 4/004 713/176 |
| 2011/0140910 A1 | 6/2011 | Olson et al. | |
| 2011/0188420 A1* | 8/2011 | Filoso | H04W 8/005 370/311 |
| 2011/0316717 A1* | 12/2011 | Young | G01D 4/002 340/870.07 |
| 2013/0084826 A1* | 4/2013 | Mo | H04L 41/5029 455/406 |
| 2013/0234863 A1* | 9/2013 | Vos | G01D 4/006 340/870.03 |
| 2014/0055282 A1* | 2/2014 | Holmdahl | G01D 4/006 340/870.02 |
| 2014/0097965 A1* | 4/2014 | Bharat | G01D 4/002 340/870.02 |

OTHER PUBLICATIONS

Introducing MOSAIC™ "How to step up without starting over" Datamatic, paper, 2007.
Malone, "Hybrids: No longer just for cars", Water Utility Infrastructure Management, Nov./Dec. 26-27, 2011.

* cited by examiner

COLLECTION SYSTEM WITH A HYBRID NODE PERFORMING BOTH FIXED NETWORK AND MOBILE COMMUNICATIONS

CROSS REFERENCE TO RELATED APPLICATIONS

This application claims the benefit of U.S. Provisional Patent Application No. 61/727,552, filed Nov. 16, 2012, which is incorporated herein by reference in its entirety.

TECHNICAL BACKGROUND

The reading of electrical energy, water flow, and gas usage has historically been accomplished with human meter readers who came on-site and manually documented meter readings. Over time, this manual meter reading methodology has been enhanced with walk by or drive by reading systems that use radio communications to and from a mobile collector device in a vehicle. Recently, there has been a concerted effort to accomplish meter reading using fixed communication networks that allow data to flow from the meter to a host computer system without human intervention.

Automated systems, such as Automatic Meter Reading (AMR) and Advanced Metering Infrastructure (AMI) systems, may use radio frequency (RF) signals to collect data from transponders attached to meters that measure usage of resources, such as gas, water and electricity. AMR systems use a mobile interrogator, such as a handheld computer equipped with RF technology or a vehicle-based RF system, to collect meter data. Such systems may employ a number of different infrastructures for collecting this meter data from the meters. For example, some automated systems obtain data from the meters using a fixed wireless network that includes, for example, a central node, e.g., a collection device, in communication with a number of endpoint nodes (e.g., meter reading devices (MRDs) connected to meters). At the endpoint nodes, the wireless communications circuitry may be incorporated into the meters themselves, such that each endpoint node in the wireless network comprises a meter connected to an MRD that has wireless communication circuitry that enables the MRD to transmit the meter data of the meter to which it is connected. The wireless communication circuitry may include a transponder that is uniquely identified by a transponder serial number. The endpoint nodes may either transmit their meter data directly to the central node, or indirectly though one or more intermediate bi-directional nodes that serve as repeaters for the meter data of the transmitting node.

Some networks may employ a mesh networking architecture. In such networks, known as "mesh networks," endpoint nodes are connected to one another through wireless communication links such that each endpoint node has a wireless communication path to the central node. One characteristic of mesh networks is that the component nodes can all connect to one another via one or more "hops." Due to this characteristic, mesh networks can continue to operate even if a node or a connection breaks down. Accordingly, mesh networks are self-configuring and self-healing, significantly reducing installation and maintenance efforts.

Data collection systems such as electric, gas, and water utility systems tend to fall into two classifications: fixed or mobile network. Each has advantages and disadvantages. A fixed network typically has a tree structure with endpoints at the extreme ends of the tree. These endpoints relay their data toward a central head end by passing data first through a local area network (LAN) including other endpoints, repeaters, and collectors, and then through a wide area network (WAN) to the head end. Some units, such as electric meters, in a fixed network are always on. Other units, such as sleepy gas meters, water meters, and in-home modules, are battery operated and periodically receive a wake-up signal to tie into the network. This periodic wake-up process can be unilateral at the discretion of the endpoint or the result of a wake-up process initiated by adjacent always-on devices.

A mobile network can be drive-by, fly-by, or walk-by in nature and typically involves a mobile interrogator traveling a predetermined route to gather data from endpoint devices in residential and commercial locations. The mobile interrogator may also issue commands to the endpoint devices. The endpoint devices may include water, gas, and electric metering and control devices, such as thermostats and load control devices. There is typically little or no communication between endpoint devices themselves, and each endpoint device typically maintains its own history of data for the past collection period. The mobile interrogator wakes up the endpoint devices for the communication exchange. Alternatively, the devices may unilaterally transmit their data periodically so that the mobile interrogator can receive the data whenever it travels by. The collected data is passed from the mobile interrogator to a route manager, and then up to a head end that interfaces to a utility billing system.

SUMMARY OF THE DISCLOSURE

According to various embodiments, the capabilities of a mobile interrogator can be enhanced. As a result, the performance of both fixed and mobile networks can be improved. In addition, a hybrid system can be realized that provides a utility company with advantages of both fixed and mobile networks.

One embodiment is directed to a system for hybrid employment of fixed network and mobile network communications. The system includes a plurality of communication nodes. At least some of the communication nodes operate in a fixed network mode using one or more fixed wireless network communication protocols. At least some other of the communication nodes operate in a mobile mode in which they transmit meter data to a mobile device using one or more mobile communication protocols. The mobile device is configured to communicate with the mobile mode communication nodes using the one or more mobile communication protocols. The mobile device is further configured to communicate with the fixed network mode communication nodes using the one or more fixed wireless network communication protocols.

Another embodiment is directed to a mobile device comprising a display and a user interface presented at least partially using the display. The user interface may include a representation of a plurality of communication nodes, at least some of the communication nodes operating in a fixed network mode using one or more fixed wireless network communication protocols, and at least some other of the communication nodes operating in a mobile mode in which they transmit meter data to the mobile device using one or more mobile communication protocols. The user interface may employ different audio and/or visual indicators to provide information used by the mobile device to communicate with both the fixed network mode communication nodes and the mobile mode communication nodes.

Yet another embodiment is directed to a method for improved route navigation for traversing meters in a metering network. One or more meter route preference criteria and one or more meter attribute filters are received. The meter route preference criteria describe one or more user preferences for navigating a selected group of meters. The meter attribute filters enable the selected group of meters to be filtered out from a plurality of meters. A route for traversing the selected group of meters is generated in accordance with the meter route preference criteria and the meter attribute filters.

Various embodiments may realize certain advantages. For example, in a fixed network, a mobile interrogator device can be used as a substitute for a collector or repeater to collect data from endpoint devices. In a mobile network, a mobile interrogator device can improve travel speeds by taking advantage of fixed network type devices that are deployed in a mobile network. In both fixed and mobile networks, a mobile interrogator device can provide a variety of communication paths, including both LAN and WAN communications. In this way, utility companies can blur the boundaries of fixed and mobile networks and selectively operate their networks in a fixed mode, a mobile mode, or both modes simultaneously. Advantageous performance and improved reliability relative to some conventional networks can be realized as a result.

BRIEF DESCRIPTION OF THE DRAWINGS

The foregoing summary, as well as the following detailed description of various embodiments, is better understood when read in conjunction with the appended drawings. For the purpose of illustrating the invention, there are shown in the drawings exemplary embodiments of various aspects of the invention; however, the invention is not limited to the specific methods and instrumentalities disclosed. In the drawings.

DETAILED DESCRIPTION

Exemplary systems and methods for gathering meter data are described below with reference to FIGS. 1-10. It will be appreciated by those of ordinary skill in the art that the description given herein with respect to those figures is for exemplary purposes only and is not intended in any way to limit the scope of potential embodiments.

Generally, a plurality of meter devices, which operate to track usage of a service or commodity such as, for example, electricity, water, and gas, are operable to wirelessly communicate. One or more devices, referred to herein as "collectors," are provided that "collect" data transmitted by the other meter devices so that it can be accessed by other computer systems. The collectors receive and compile metering data from a plurality of meter devices via wireless communications. A data collection server may communicate with the collectors to retrieve the compiled meter data.

Figure 1:
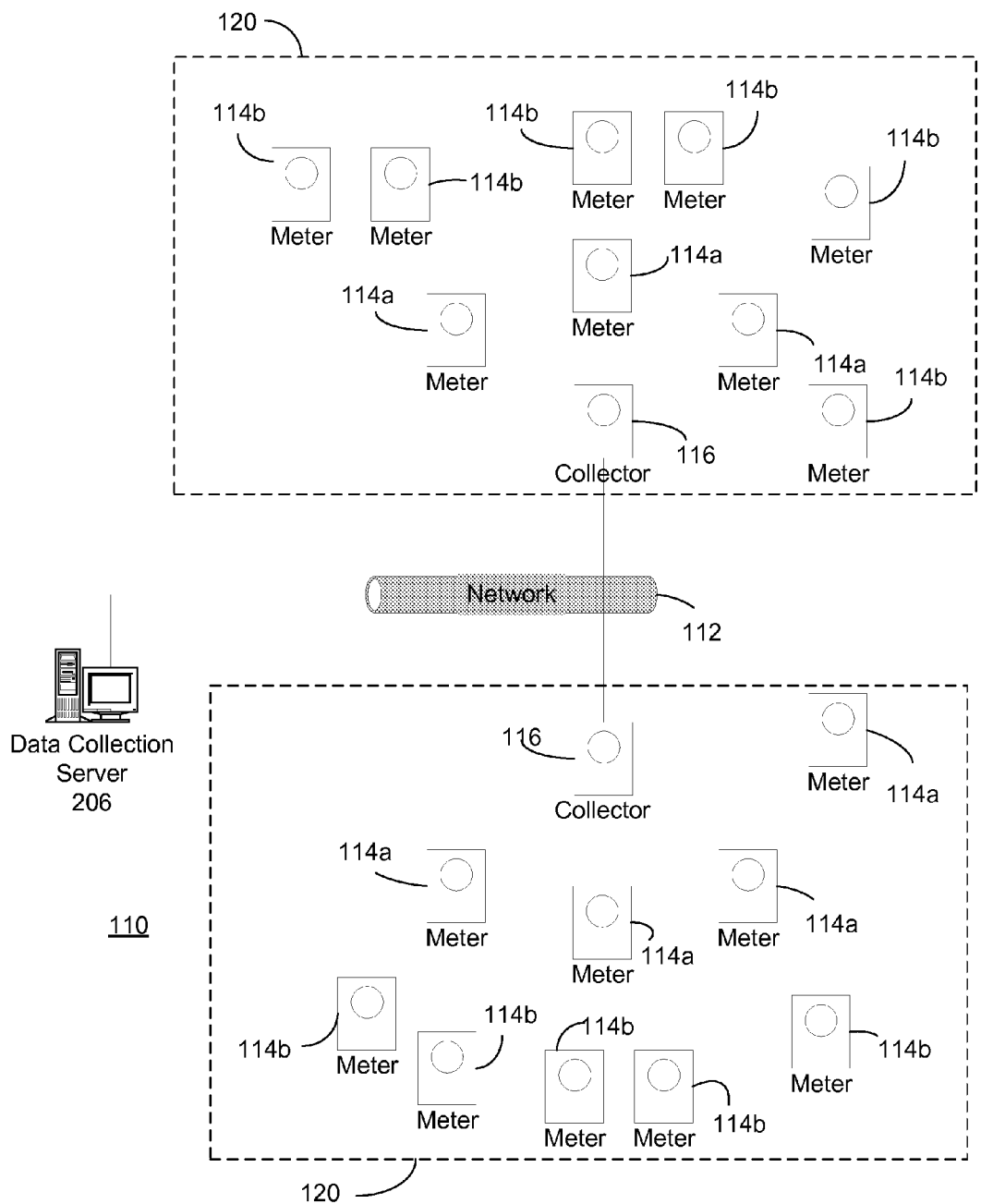
FIG. 1 is a diagram of an exemplary metering system.

FIG. 1 provides a diagram of one exemplary metering system 110. System 110 comprises a plurality of meters 114, which are operable to sense and record consumption or usage of a service or commodity such as, for example, electricity, water, or gas. Meters 114 may be located at customer premises such as, for example, a home or place of business. Meters 114 comprise circuitry for measuring the consumption of the service or commodity being consumed at their respective locations and for generating data reflecting the consumption, as well as other data related thereto. Meters 114 may also comprise circuitry for wirelessly transmitting data generated by the meter to a remote location. Meters 114 may further comprise circuitry for receiving data, commands or instructions wirelessly as well. Meters that are operable to both receive and transmit data may be referred to as "bi-directional" or "two-way" meters, while meters that are only capable of transmitting data may be referred to as "transmit-only" or "one-way" meters. In bi-directional meters, the circuitry for transmitting and receiving may comprise a transceiver. In an illustrative embodiment, meters 114 may be, for example, electricity meters manufactured by Elster Solutions, LLC and marketed under the tradename REX.

System 110 further comprises collectors 116. In one embodiment, collectors 116 are also meters operable to detect and record usage of a service or commodity such as, for example, electricity, water, or gas. In addition, collectors 116 are operable to send data to and receive data from meters 114. Thus, like the meters 114, the collectors 116 may comprise both circuitry for measuring the consumption of a service or commodity and for generating data reflecting the consumption and circuitry for transmitting and receiving data. In one embodiment, collector 116 and meters 114 communicate with and amongst one another using any one of several wireless techniques such as, for example, frequency hopping spread spectrum (FHSS) and direct sequence spread spectrum (DSSS).

A collector 116 and the meters 114 with which it communicates define a subnet/LAN 120 of system 110. As used herein, meters 114 and collectors 116 may be referred to as "nodes" in the subnet 120. In each subnet/LAN 120, each meter transmits data related to consumption of the commodity being metered at the meter's location. The collector 116 receives the data transmitted by each meter 114, effectively "collecting" it, and then periodically transmits the data from all of the meters in the subnet/LAN 120 to a data collection server 206. The data collection server 206 stores the data for analysis and preparation of bills, for example. The data collection server 206 may be a specially programmed general purpose computing system and may communicate with collectors 116 via a network 112. The network 112 may comprise any form of network, including a wireless network or a fixed-wire network, such as a local area network (LAN), a wide area network, the Internet, an intranet, a telephone network, such as the public switched telephone network (PSTN), a Frequency Hopping Spread Spectrum (FHSS) radio network, a mesh network, a Wi-Fi (802.11) network, a Wi-Max (802.16) network, a land line (POTS) network, or any combination of the above.

Figure 2:
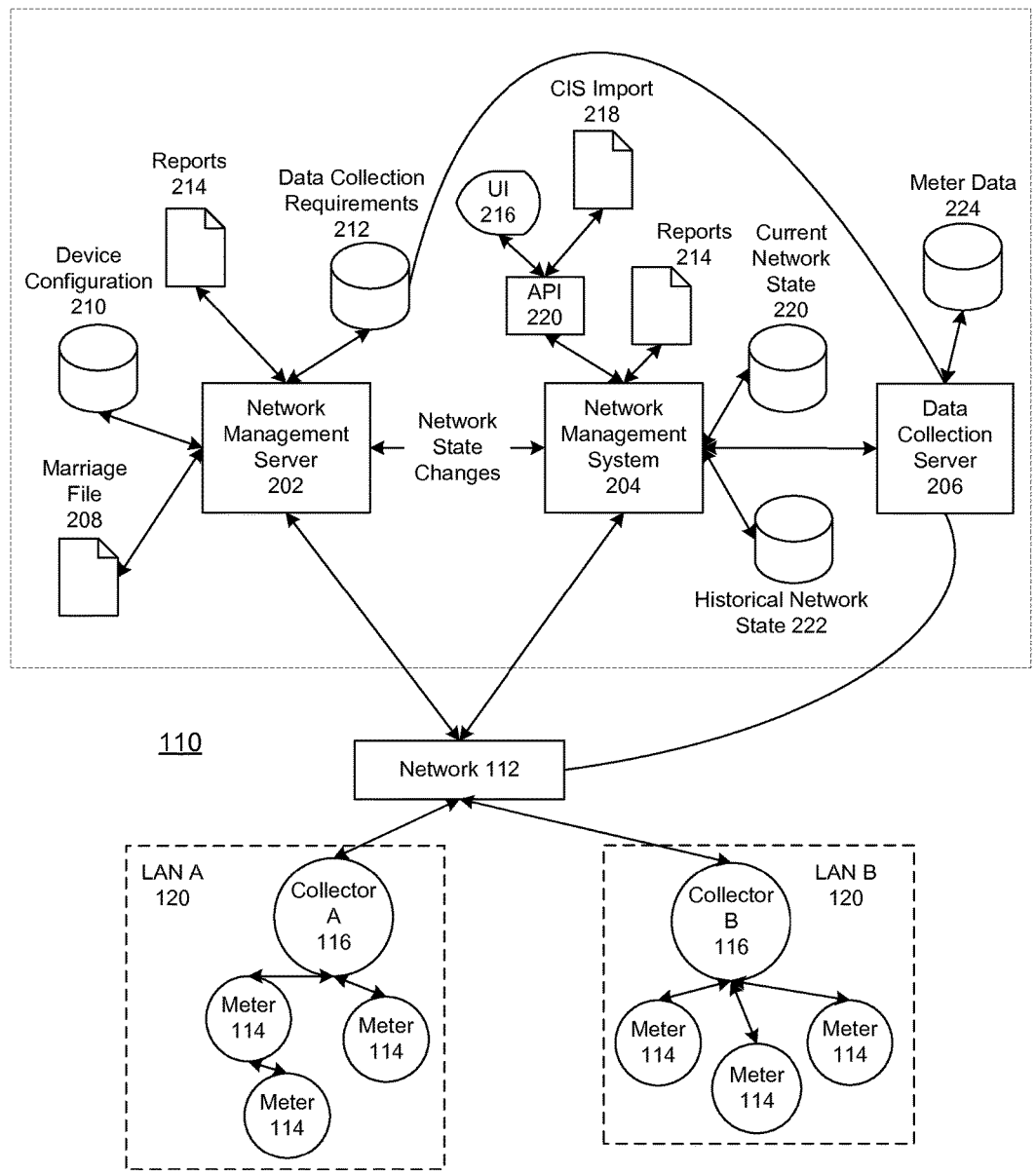
FIG. 2 expands upon the diagram of FIG. 1 and illustrates an exemplary metering system in greater detail.

Referring now to FIG. 2, further details of the metering system 110 are shown. Typically, the system will be operated by a utility company or a company providing information technology services to a utility company. As shown, the system 110 comprises a network management server 202, a network management system (NMS) 204 and the data collection server 206 that together manage one or more subnets/LANs 120 and their constituent nodes. The NMS 204 tracks changes in network state, such as new nodes registering/unregistering with the system 110, node communication paths changing, etc. This information is collected for each subnet/LAN 120 and is detected and forwarded to the network management server 202 and data collection server 206.

Each of the meters 114 and collectors 116 is assigned an identifier (LAN ID) that uniquely identifies that meter or collector on its subnet/LAN 120. In this embodiment, communication between nodes (i.e., the collectors and meters) and the system 110 is accomplished using the LAN ID. However, it is preferable for operators of a utility to query and communicate with the nodes using their own identifiers. To this end, a marriage file 208 may be used to correlate a utility's identifier for a node (e.g., a utility serial number) with both a manufacturer serial number (i.e., a serial number assigned by the manufacturer of the meter) and the LAN ID for each node in the subnet/LAN 120. In this manner, the utility can refer to the meters and collectors by the utilities identifier, while the system can employ the LAN ID for the purpose of designating particular meters during system communications.

A device configuration database 210 stores configuration information regarding the nodes. For example, in the metering system 200, the device configuration database may include data regarding time of use (TOU) switchpoints, etc. for the meters 114 and collectors 116 communicating in the system 110. A data collection requirements database 212 contains information regarding the data to be collected on a per node basis. For example, a utility may specify that metering data such as load profile, demand, TOU, etc. is to be collected from particular meter(s) 114a. Reports 214 containing information on the network configuration may be automatically generated or in accordance with a utility request.

The network management system (NMS) 204 maintains a database describing the current state of the global fixed network system (current network state 220) and a database describing the historical state of the system (historical network state 222). The current network state 220 contains data regarding current meter-to-collector assignments, etc. for each subnet/LAN 120. The historical network state 222 is a database from which the state of the network at a particular point in the past can be reconstructed. The NMS 204 is responsible for, amongst other things, providing reports 214 about the state of the network. The NMS 204 may be accessed via an API 220 that is exposed to a user interface 216 and a Customer Information System (CIS) 218. Other external interfaces may also be implemented. In addition, the data collection requirements stored in the database 212 may be set via the user interface 216 or CIS 218.

The data collection server 206 collects data from the nodes (e.g., collectors 116) and stores the data in a database 224. The data includes metering information, such as energy consumption and may be used for billing purposes, etc. by a utility provider.

The network management server 202, network management system 204 and data collection server 206 communicate with the nodes in each subnet/LAN 120 via network 110.

Figure 3A:
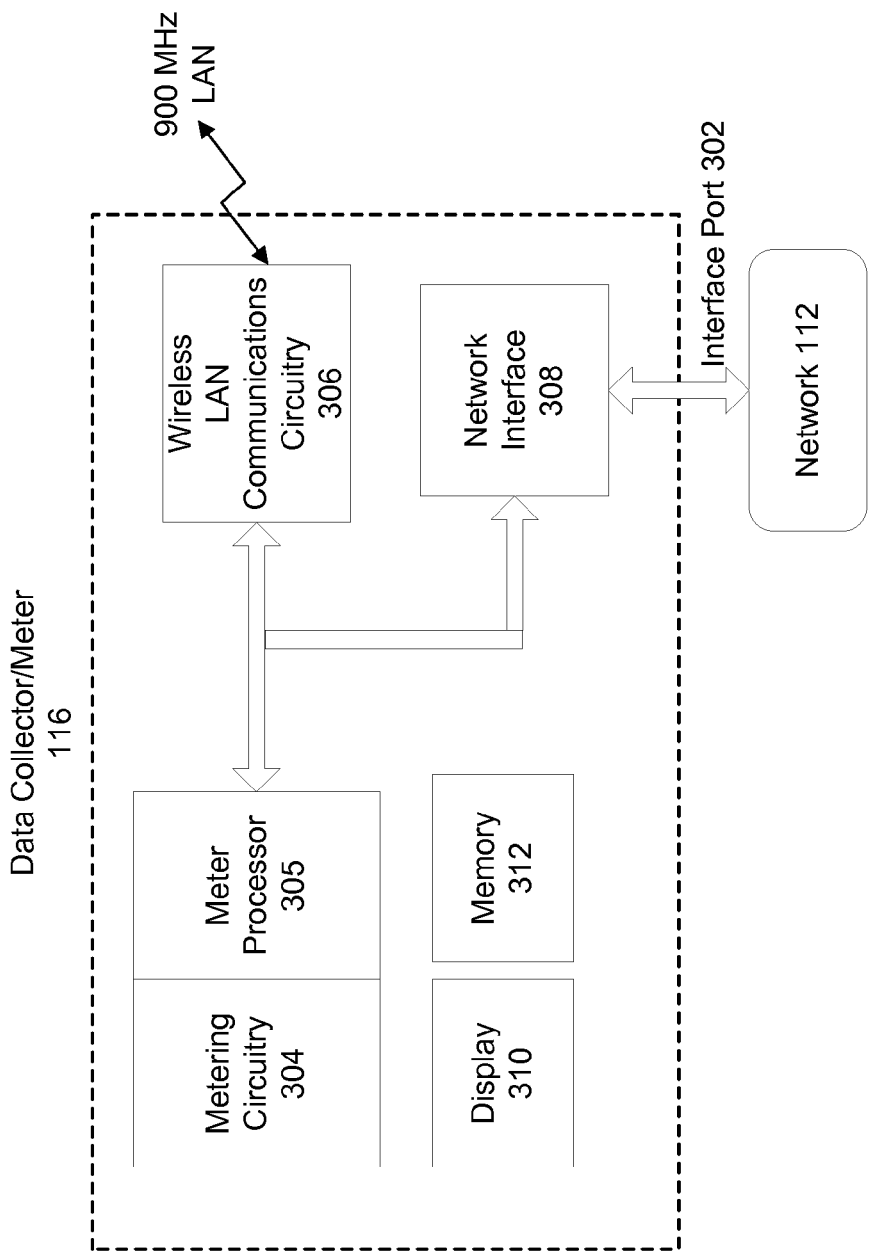
FIG. 3A is a block diagram illustrating an exemplary collector.

FIG. 3A is a block diagram illustrating further details of one embodiment of a collector 116. Although certain components are designated and discussed with reference to FIG. 3A, it should be appreciated that the invention is not limited to such components. In fact, various other components typically found in an electronic meter may be a part of collector 116, but have not been shown in FIG. 3A for the purposes of clarity and brevity. Also, the invention may use other components to accomplish the operation of collector 116. The components that are shown and the functionality described for collector 116 are provided as examples, and are not meant to be exclusive of other components or other functionality.

As shown in FIG. 3A, collector 116 may comprise metering circuitry 304 that performs measurement of consumption of a service or commodity and a processor 305 that controls the overall operation of the metering functions of the collector 116. The collector 116 may further comprise a display 310 for displaying information such as measured quantities and meter status and a memory 312 for storing data. The collector 116 further comprises wireless LAN communications circuitry 306 for communicating wirelessly with the meters 114 in a subnet/LAN and a network interface 308 for communication over the network 112.

In one embodiment, the metering circuitry 304, processor 305, display 310 and memory 312 are implemented using an A3 ALPHA meter available from Elster Solutions, LLC. In that embodiment, the wireless LAN communications circuitry 306 may be implemented by a LAN Option Board (e.g., a 900 MHz two-way radio) installed within the A3 ALPHA meter, and the network interface 308 may be implemented by a WAN Option Board (e.g., a telephone modem) also installed within the A3 ALPHA meter. In this embodiment, the WAN Option Board 308 routes messages from network 112 (via interface port 302) to either the meter processor 305 or the LAN Option Board 306. LAN Option Board 306 may use a transceiver (not shown), for example a 900 MHz radio, to communicate data to meters 114. Also, LAN Option Board 306 may have sufficient memory to store data received from meters 114. This data may include, but is not limited to the following: current billing data (e.g., the present values stored and displayed by meters 114), previous billing period data, previous season data, and load profile data.

LAN Option Board 306 may be capable of synchronizing its time to a real time clock (not shown) in A3 ALPHA meter, thereby synchronizing the LAN reference time to the time in the meter. The processing necessary to carry out the communication functionality and the collection and storage of metering data of the collector 116 may be handled by the processor 305 and/or additional processors (not shown) in the LAN Option Board 306 and the WAN Option Board 308.

The responsibility of a collector 116 is wide and varied. Generally, collector 116 is responsible for managing, processing and routing data communicated between the collector and network 112 and between the collector and meters 114. Collector 116 may continually or intermittently read the current data from meters 114 and store the data in a database (not shown) in collector 116. Such current data may include but is not limited to the total kWh usage, the Time-Of-Use (TOU) kWh usage, peak kW demand, and other energy consumption measurements and status information. Collector 116 also may read and store previous billing and previous season data from meters 114 and store the data in the database in collector 116. The database may be implemented as one or more tables of data within the collector 116.

Figure 3B:
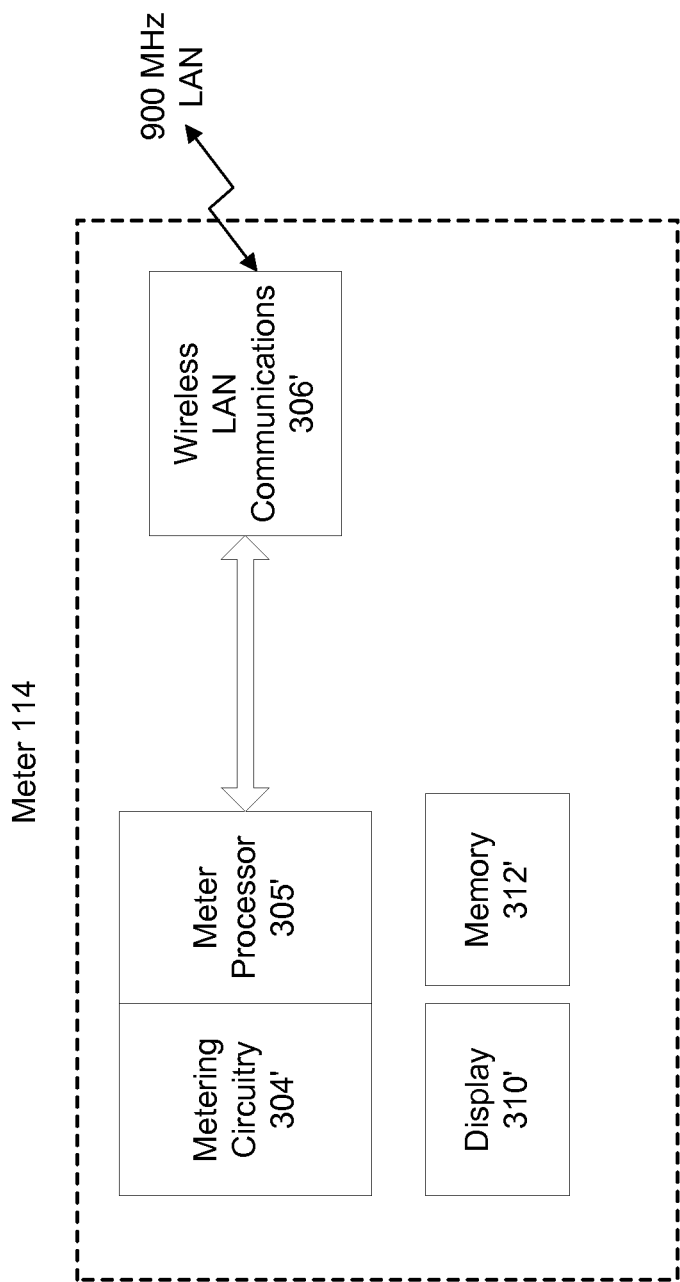
FIG. 3B is a block diagram illustrating an exemplary meter.

FIG. 3B is a block diagram of an exemplary embodiment of a meter 114 that may operate in the system 110 of FIGS. 1 and 2. As shown, the meter 114 comprises metering circuitry 304' for measuring the amount of a service or commodity that is consumed, a processor 305' that controls the overall functions of the meter, a display 310' for displaying meter data and status information, and a memory 312' for storing data and program instructions. The meter 114 further comprises wireless communications circuitry 306' for transmitting and receiving data to/from other meters 114 or a collector 116.

Referring again to FIG. 1, in the exemplary embodiment shown, a collector 116 directly communicates with only a subset of the plurality of meters 114 in its particular subnet/LAN. Meters 114 with which collector 116 directly communicates may be referred to as "level one" meters 114a. The level one meters 114a are said to be one "hop" from the collector 116. Communications between collector 116 and meters 114 other than level one meters 114a are relayed through the level one meters 114a. Thus, the level one meters 114a operate as repeaters for communications between collector 116 and meters 114 located further away in subnet 120.

Each level one meter 114a typically will only be in range to directly communicate with only a subset of the remaining meters 114 in the subnet 120. The meters 114 with which the level one meters 114a directly communicate may be referred to as level two meters 114b. Level two meters 114b are one "hop" from level one meters 114a, and therefore two "hops" from collector 116. Level two meters 114b operate as repeaters for communications between the level one meters 114a and meters 114 located further away from collector 116 in the subnet 120.

While only three levels of meters are shown (collector 116, first level 114a, second level 114b) in FIG. 1, a subnet 120 may comprise any number of levels of meters 114. For example, a subnet 120 may comprise one level of meters but might also comprise eight or more levels of meters 114. In an embodiment wherein a subnet comprises eight levels of meters 114, as many as 1024 meters might be registered with a single collector 116.

As mentioned above, each meter 114 and collector 116 that is installed in the system 110 has a unique identifier (LAN ID) stored thereon that uniquely identifies the device from all other devices in the system 110. Additionally, meters 114 operating in a subnet 120 comprise information including the following: data identifying the collector with which the meter is registered; the level in the subnet at which the meter is located; the repeater meter at the prior level with which the meter communicates to send and receive data to/from the collector; an identifier indicating whether the meter is a repeater for other nodes in the subnet; and if the meter operates as a repeater, the identifier that uniquely identifies the repeater within the particular subnet, and the number of meters for which it is a repeater. Collectors 116 have stored thereon all of this same data for all meters 114 that are registered therewith. Thus, collector 116 comprises data identifying all nodes registered therewith as well as data identifying the registered path by which data is communicated from the collector to each node. Each meter 114 therefore has a designated communications path to the collector that is either a direct path (e.g., all level one nodes) or an indirect path through one or more intermediate nodes that serve as repeaters.

Information is transmitted in this embodiment in the form of packets. For most network tasks such as, for example, reading meter data, collector 116 communicates with meters 114 in the subnet 120 using point-to-point transmissions. For example, a message or instruction from collector 116 is routed through the designated set of repeaters to the desired meter 114. Similarly, a meter 114 communicates with collector 116 through the same set of repeaters, but in reverse.

In some instances, however, collector 116 may need to quickly communicate information to all meters 114 located in its subnet 120. Accordingly, collector 116 may issue a broadcast message that is meant to reach all nodes in the subnet 120. The broadcast message may be referred to as a "flood broadcast message." A flood broadcast originates at collector 116 and propagates through the entire subnet 120 one level at a time. For example, collector 116 may transmit a flood broadcast to all first level meters 114a. The first level meters 114a that receive the message pick a random time slot and retransmit the broadcast message to second level meters 114b. Any second level meter 114b can accept the broadcast, thereby providing better coverage from the collector out to the end point meters. Similarly, the second level meters 114b that receive the broadcast message pick a random time slot and communicate the broadcast message to third level meters. This process continues out until the end nodes of the subnet. Thus, a broadcast message gradually propagates outward from the collector to the nodes of the subnet 120.

The flood broadcast packet header contains information to prevent nodes from repeating the flood broadcast packet more than once per level. For example, within a flood broadcast message, a field might exist that indicates to meters/nodes which receive the message, the level of the subnet the message is located; only nodes at that particular level may rebroadcast the message to the next level. If the collector broadcasts a flood message with a level of 1, only level 1 nodes may respond. Prior to re-broadcasting the flood message, the level 1 nodes increment the field to 2 so that only level 2 nodes respond to the broadcast. Information within the flood broadcast packet header ensures that a flood broadcast will eventually die out.

Generally, a collector 116 issues a flood broadcast several times, e.g. five times, successively to increase the probability that all meters in the subnet 120 receive the broadcast. A delay is introduced before each new broadcast to allow the previous broadcast packet time to propagate through all levels of the subnet.

Meters 114 may have a clock formed therein. However, meters 114 often undergo power interruptions that can interfere with the operation of any clock therein. Accordingly, the clocks internal to meters 114 cannot be relied upon to provide an accurate time reading. Having the correct time is necessary, however, when time of use metering is being employed. Indeed, in an embodiment, time of use schedule data may also be comprised in the same broadcast message as the time. Accordingly, collector 116 periodically flood broadcasts the real time to meters 114 in subnet 120. Meters 114 use the time broadcasts to stay synchronized with the rest of the subnet 120. In an illustrative embodiment, collector 116 broadcasts the time every 15 minutes. The broadcasts may be made near the middle of 15 minute clock boundaries that are used in performing load profiling and time of use (TOU) schedules so as to minimize time changes near these boundaries. Maintaining time synchronization is important to the proper operation of the subnet 120. Accordingly, lower priority tasks performed by collector 116 may be delayed while the time broadcasts are performed.

In an illustrative embodiment, the flood broadcasts transmitting time data may be repeated, for example, five times, so as to increase the probability that all nodes receive the time. Furthermore, where time of use schedule data is communicated in the same transmission as the timing data, the subsequent time transmissions allow a different piece of the time of use schedule to be transmitted to the nodes.

Exception messages are used in subnet 120 to transmit unexpected events that occur at meters 114 to collector 116. In an embodiment, the first 4 seconds of every 32-second period are allocated as an exception window for meters 114 to transmit exception messages. Meters 114 transmit their exception messages early enough in the exception window so the message has time to propagate to collector 116 before the end of the exception window. Collector 116 may process the exceptions after the 4-second exception window. Generally, a collector 116 acknowledges exception messages, and collector 116 waits until the end of the exception window to send this acknowledgement.

In an illustrative embodiment, exception messages are configured as one of three different types of exception messages: local exceptions, which are handled directly by the collector 116 without intervention from data collection server 206; an immediate exception, which is generally relayed to data collection server 206 under an expedited schedule; and a daily exception, which is communicated to the communication server 122 on a regular schedule.

Exceptions are processed as follows. When an exception is received at collector 116, the collector 116 identifies the type of exception that has been received. If a local exception has been received, collector 116 takes an action to remedy the problem. For example, when collector 116 receives an exception requesting a "node scan request" such as discussed below, collector 116 transmits a command to initiate a scan procedure to the meter 114 from which the exception was received.

If an immediate exception type has been received, collector 116 makes a record of the exception. An immediate exception might identify, for example, that there has been a power outage. Collector 116 may log the receipt of the exception in one or more tables or files. In an illustrative example, a record of receipt of an immediate exception is made in a table referred to as the "Immediate Exception Log Table." Collector 116 then waits a set period of time before taking further action with respect to the immediate exception. For example, collector 116 may wait 64 seconds. This delay period allows the exception to be corrected before communicating the exception to the data collection server 206. For example, where a power outage was the cause of the immediate exception, collector 116 may wait a set period of time to allow for receipt of a message indicating the power outage has been corrected.

If the exception has not been corrected, collector 116 communicates the immediate exception to data collection server 206. For example, collector 116 may initiate a dial-up connection with data collection server 206 and download the exception data. After reporting an immediate exception to data collection server 206, collector 116 may delay reporting any additional immediate exceptions for a period of time such as ten minutes. This is to avoid reporting exceptions from other meters 114 that relate to, or have the same cause as, the exception that was just reported.

If a daily exception was received, the exception is recorded in a file or a database table. Generally, daily exceptions are occurrences in the subnet 120 that need to be reported to data collection server 206, but are not so urgent that they need to be communicated immediately. For example, when collector 116 registers a new meter 114 in subnet 120, collector 116 records a daily exception identifying that the registration has taken place. In an illustrative embodiment, the exception is recorded in a database table referred to as the "Daily Exception Log Table." Collector 116 communicates the daily exceptions to data collection server 206. Generally, collector 116 communicates the daily exceptions once every 24 hours.

In the present embodiment, a collector assigns designated communications paths to meters with bi-directional communication capability, and may change the communication paths for previously registered meters if conditions warrant. For example, when a collector 116 is initially brought into system 110, it needs to identify and register meters in its subnet 120. A "node scan" refers to a process of communication between a collector 116 and meters 114 whereby the collector may identify and register new nodes in a subnet 120 and allow previously registered nodes to switch paths. A collector 116 can implement a node scan on the entire subnet, referred to as a "full node scan," or a node scan can be performed on specially identified nodes, referred to as a "node scan retry."

A full node scan may be performed, for example, when a collector is first installed. The collector 116 must identify and register nodes from which it will collect usage data. The collector 116 initiates a node scan by broadcasting a request, which may be referred to as a Node Scan Procedure request. Generally, the Node Scan Procedure request directs that all unregistered meters 114 or nodes that receive the request respond to the collector 116. The request may comprise information such as the unique address of the collector that initiated the procedure. The signal by which collector 116 transmits this request may have limited strength and therefore is detected only at meters 114 that are in proximity of collector 116. Meters 114 that receive the Node Scan Procedure request respond by transmitting their unique identifier as well as other data.

For each meter from which the collector receives a response to the Node Scan Procedure request, the collector tries to qualify the communications path to that meter before registering the meter with the collector. That is, before registering a meter, the collector 116 attempts to determine whether data communications with the meter will be sufficiently reliable. In one embodiment, the collector 116 determines whether the communication path to a responding meter is sufficiently reliable by comparing a Received Signal Strength Indication (RSSI) value (i.e., a measurement of the received radio signal strength) measured with respect to the received response from the meter to a selected threshold value. For example, the threshold value may be −60 dBm. RSSI values above this threshold would be deemed sufficiently reliable. In another embodiment, qualification is performed by transmitting a predetermined number of additional packets to the meter, such as ten packets, and counting the number of acknowledgements received back from the meter. If the number of acknowledgments received is greater than or equal to a selected threshold (e.g., 8 out of 10), then the path is considered to be reliable. In other embodiments, a combination of the two qualification techniques may be employed.

If the qualification threshold is not met, the collector 116 may add an entry for the meter to a "Straggler Table." The entry includes the meter's LAN ID, its qualification score (e.g., 5 out of 10; or its RSSI value), its level (in this case level one) and the unique ID of its parent (in this case the collector's ID).

If the qualification threshold is met or exceeded, the collector 116 registers the node. Registering a meter 114 comprises updating a list of the registered nodes at collector 116. For example, the list may be updated to identify the meter's system-wide unique identifier and the communication path to the node. Collector 116 also records the meter's level in the subnet (i.e. whether the meter is a level one node, level two node, etc.), whether the node operates as a repeater, and if so, the number of meters for which it operates as a repeater. The registration process further comprises transmitting registration information to the meter 114. For example, collector 116 forwards to meter 114 an indication that it is registered, the unique identifier of the collector with which it is registered, the level the meter exists at in the subnet, and the unique identifier of its parent meter that will serve as a repeater for messages the meter may send to the collector. In the case of a level one node, the parent is the collector itself. The meter stores this data and begins to operate as part of the subnet by responding to commands from its collector 116.

Qualification and registration continues for each meter that responds to the collector's initial Node Scan Procedure request. The collector 116 may rebroadcast the Node Scan Procedure additional times so as to insure that all meters 114 that may receive the Node Scan Procedure have an opportunity for their response to be received and the meter qualified as a level one node at collector 116.

The node scan process then continues by performing a similar process as that described above at each of the now registered level one nodes. This process results in the identification and registration of level two nodes. After the level two nodes are identified, a similar node scan process is performed at the level two nodes to identify level three nodes, and so on.

Specifically, to identify and register meters that will become level two meters, for each level one meter, in succession, the collector 116 transmits a command to the level one meter, which may be referred to as an "Initiate Node Scan Procedure" command. This command instructs the level one meter to perform its own node scan process. The request comprises several data items that the receiving meter may use in completing the node scan. For example, the request may comprise the number of timeslots available for responding nodes, the unique address of the collector that initiated the request, and a measure of the reliability of the communications between the target node and the collector. As described below, the measure of reliability may be employed during a process for identifying more reliable paths for previously registered nodes.

The meter that receives the Initiate Node Scan Response request responds by performing a node scan process similar to that described above. More specifically, the meter broadcasts a request to which all unregistered nodes may respond. The request comprises the number of timeslots available for responding nodes (which is used to set the period for the node to wait for responses), the unique address of the collector that initiated the node scan procedure, a measure of the reliability of the communications between the sending node and the collector (which may be used in the process of determining whether a meter's path may be switched as described below), the level within the subnet of the node sending the request, and an RSSI threshold (which may also be used in the process of determining whether a registered meter's path may be switched). The meter issuing the node scan request then waits for and receives responses from unregistered nodes. For each response, the meter stores in memory the unique identifier of the responding meter. This information is then transmitted to the collector.

For each unregistered meter that responded to the node scan issued by the level one meter, the collector attempts again to determine the reliability of the communication path to that meter. In one embodiment, the collector sends a "Qualify Nodes Procedure" command to the level one node which instructs the level one node to transmit a predetermined number of additional packets to the potential level two node and to record the number of acknowledgements received back from the potential level two node. This qualification score (e.g., 8 out of 10) is then transmitted back to the collector, which again compares the score to a qualification threshold. In other embodiments, other measures of the communications reliability may be provided, such as an RSSI value.

If the qualification threshold is not met, then the collector adds an entry for the node in the Straggler Table, as discussed above. However, if there already is an entry in the Straggler Table for the node, the collector will update that entry only if the qualification score for this node scan procedure is better than the recorded qualification score from the prior node scan that resulted in an entry for the node.

If the qualification threshold is met or exceeded, the collector 116 registers the node. Again, registering a meter 114 at level two comprises updating a list of the registered nodes at collector 116. For example, the list may be updated to identify the meter's unique identifier and the level of the meter in the subnet. Additionally, the collector's 116 registration information is updated to reflect that the meter 114 from which the scan process was initiated is identified as a repeater (or parent) for the newly registered node. The registration process further comprises transmitting information to the newly registered meter as well as the meter that will serve as a repeater for the newly added node. For example, the node that issued the node scan response request is updated to identify that it operates as a repeater and, if it was previously registered as a repeater, increments a data item identifying the number of nodes for which it serves as a repeater. Thereafter, collector 116 forwards to the newly registered meter an indication that it is registered, an identification of the collector 116 with which it is registered, the level the meter exists at in the subnet, and the unique identifier of the node that will serve as its parent, or repeater, when it communicates with the collector 116.

The collector then performs the same qualification procedure for each other potential level two node that responded to the level one node's node scan request. Once that process is completed for the first level one node, the collector initiates the same procedure at each other level one node until the process of qualifying and registering level two nodes has been completed at each level one node. Once the node scan procedure has been performed by each level one node, resulting in a number of level two nodes being registered with the collector, the collector will then send the Initiate Node Scan Response command to each level two node, in turn. Each level two node will then perform the same node scan procedure as performed by the level one nodes, potentially resulting in the registration of a number of level three nodes. The process is then performed at each successive node, until a maximum number of levels is reached (e.g., seven levels) or no unregistered nodes are left in the subnet.

It will be appreciated that in the present embodiment, during the qualification process for a given node at a given level, the collector qualifies the last "hop" only. For example, if an unregistered node responds to a node scan request from a level four node, and therefore, becomes a potential level five node, the qualification score for that node is based on the reliability of communications between the level four node and the potential level five node (i.e., packets transmitted by the level four node versus acknowledgments received from the potential level five node), not based on any measure of the reliability of the communications over the full path from the collector to the potential level five node. In other embodiments, of course, the qualification score could be based on the full communication path.

At some point, each meter will have an established communication path to the collector which will be either a direct path (i.e., level one nodes) or an indirect path through one or more intermediate nodes that serve as repeaters. If during operation of the network, a meter registered in this manner fails to perform adequately, it may be assigned a different path or possibly to a different collector as described below.

As previously mentioned, a full node scan may be performed when a collector 116 is first introduced to a network. At the conclusion of the full node scan, a collector 116 will have registered a set of meters 114 with which it communicates and reads metering data. Full node scans might be periodically performed by an installed collector to identify new meters 114 that have been brought on-line since the last node scan and to allow registered meters to switch to a different path.

In addition to the full node scan, collector 116 may also perform a process of scanning specific meters 114 in the subnet 120, which is referred to as a "node scan retry." For example, collector 116 may issue a specific request to a meter 114 to perform a node scan outside of a full node scan when on a previous attempt to scan the node, the collector 116 was unable to confirm that the particular meter 114 received the node scan request. Also, a collector 116 may request a node scan retry of a meter 114 when during the course of a full node scan the collector 116 was unable to read the node scan data from the meter 114. Similarly, a node scan retry will be performed when an exception procedure requesting an immediate node scan is received from a meter 114.

The system 110 also automatically reconfigures to accommodate a new meter 114 that may be added. More particularly, the system identifies that the new meter has begun operating and identifies a path to a collector 116 that will become responsible for collecting the metering data. Specifically, the new meter will broadcast an indication that it is unregistered. In one embodiment, this broadcast might be, for example, embedded in, or relayed as part of a request for an update of the real time as described above. The broadcast will be received at one of the registered meters 114 in proximity to the meter that is attempting to register. The registered meter 114 forwards the time to the meter that is attempting to register. The registered node also transmits an exception request to its collector 116 requesting that the collector 116 implement a node scan, which presumably will locate and register the new meter. The collector 116 then transmits a request that the registered node perform a node scan. The registered node will perform the node scan, during which it requests that all unregistered nodes respond. Presumably, the newly added, unregistered meter will respond to the node scan. When it does, the collector will then attempt to qualify and then register the new node in the same manner as described above.

Once a communication path between the collector and a meter is established, the meter can begin transmitting its meter data to the collector and the collector can transmit data and instructions to the meter. As mentioned above, data is transmitted in packets. "Outbound" packets are packets transmitted from the collector to a meter at a given level. In one embodiment, outbound packets contain the following fields, but other fields may also be included:

Length—the length of the packet;
SrcAddr—source address—in this case, the ID of the collector;
DestAddr—the LAN ID of the meter to which the packet addressed;
RptPath—the communication path to the destination meter (i.e., the list of identifiers of each repeater in the path from the collector to the destination node); and
Data—the payload of the packet.

The packet may also include integrity check information (e.g., CRC), a pad to fill-out unused portions of the packet and other control information. When the packet is transmitted from the collector, it will only be forwarded on to the destination meter by those repeater meters whose identifiers appear in the RptPath field. Other meters that may receive the packet, but that are not listed in the path identified in the RptPath field will not repeat the packet.

"Inbound" packets are packets transmitted from a meter at a given level to the collector. In one embodiment, inbound packets contain the following fields, but other fields may also be included:

Length—the length of the packet;
SrcAddr—source address—the address of the meter that initiated the packet;
DestAddr—the ID of the collector to which the packet is to be transmitted;
RptAddr—the ID of the parent node that serves as the next repeater for the sending node;
Data—the payload of the packet;

Because each meter knows the identifier of its parent node (i.e., the node in the next lower level that serves as a repeater for the present node), an inbound packet need only identify who is the next parent. When a node receives an inbound packet, it checks to see if the RptAddr matches its own identifier. If not, it discards the packet. If so, it knows that it is supposed to forward the packet on toward the collector. The node will then replace the RptAddr field with the identifier of its own parent and will then transmit the packet so that its parent will receive it. This process will continue through each repeater at each successive level until the packet reaches the collector.

For example, suppose a meter at level three initiates transmission of a packet destined for its collector. The level three node will insert in the RptAddr field of the inbound packet the identifier of the level two node that serves as a repeater for the level three node. The level three node will then transmit the packet. Several level two nodes may receive the packet, but only the level two node having an identifier that matches the identifier in the RptAddr field of the packet will acknowledge it. The other will discard it. When the level two node with the matching identifier receives the packet, it will replace the RptAddr field of the packet with the identifier of the level one packet that serves as a repeater for that level two packet, and the level two packet will then transmit the packet. This time, the level one node having the identifier that matches the RptAddr field will receive the packet. The level one node will insert the identifier of the collector in the RptAddr field and will transmit the packet. The collector will then receive the packet to complete the transmission.

A collector 116 periodically retrieves meter data from the meters that are registered with it. For example, meter data may be retrieved from a meter every 4 hours. Where there is a problem with reading the meter data on the regularly scheduled interval, the collector will try to read the data again before the next regularly scheduled interval. Nevertheless, there may be instances wherein the collector 116 is unable to read metering data from a particular meter 114 for a prolonged period of time. The meters 114 store an indication of when they are read by their collector 116 and keep track of the time since their data has last been collected by the collector 116. If the length of time since the last reading exceeds a defined threshold, such as for example, 18 hours, presumably a problem has arisen in the communication path between the particular meter 114 and the collector 116. Accordingly, the meter 114 changes its status to that of an unregistered meter and attempts to locate a new path to a collector 116 via the process described above for a new node. Thus, the exemplary system is operable to reconfigure itself to address inadequacies in the system.

In some instances, while a collector 116 may be able to retrieve data from a registered meter 114 occasionally, the level of success in reading the meter may be inadequate. For example, if a collector 116 attempts to read meter data from a meter 114 every 4 hours but is able to read the data, for example, only 70 percent of the time or less, it may be desirable to find a more reliable path for reading the data from that particular meter. Where the frequency of reading data from a meter 114 falls below a desired success level, the collector 116 transmits a message to the meter 114 to respond to node scans going forward. The meter 114 remains registered but will respond to node scans in the same manner as an unregistered node as described above. In other embodiments, all registered meters may be permitted to respond to node scans, but a meter will only respond to a node scan if the path to the collector through the meter that issued the node scan is shorter (i.e., less hops) than the meter's current path to the collector. A lesser number of hops is assumed to provide a more reliable communication path than a longer path. A node scan request always identifies the level of the node that transmits the request, and using that information, an already registered node that is permitted to respond to node scans can determine if a potential new path to the collector through the node that issued the node scan is shorter than the node's current path to the collector.

If an already registered meter 114 responds to a node scan procedure, the collector 116 recognizes the response as originating from a registered meter but that by re-registering the meter with the node that issued the node scan, the collector may be able to switch the meter to a new, more reliable path. The collector 116 may verify that the RSSI value of the node scan response exceeds an established threshold. If it does not, the potential new path will be rejected. However, if the RSSI threshold is met, the collector 116 will request that the node that issued the node scan perform the qualification process described above (i.e., send a predetermined number of packets to the node and count the number of acknowledgements received). If the resulting qualification score satisfies a threshold, then the collector will register the node with the new path. The registration process comprises updating the collector 116 and meter 114 with data identifying the new repeater (i.e. the node that issued the node scan) with which the updated node will now communicate. Additionally, if the repeater has not previously performed the operation of a repeater, the repeater would need to be updated to identify that it is a repeater. Likewise, the repeater with which the meter previously communicated is updated to identify that it is no longer a repeater for the particular meter 114. In other embodiments, the threshold determination with respect to the RSSI value may be omitted. In such embodiments, only the qualification of the last "hop" (i.e., sending a predetermined number of packets to the node and counting the number of acknowledgements received) will be performed to determine whether to accept or reject the new path.

In some instances, a more reliable communication path for a meter may exist through a collector other than that with which the meter is registered. A meter may automatically recognize the existence of the more reliable communication path, switch collectors, and notify the previous collector that the change has taken place. The process of switching the registration of a meter from a first collector to a second collector begins when a registered meter 114 receives a node scan request from a collector 116 other than the one with which the meter is presently registered. Typically, a registered meter 114 does not respond to node scan requests. However, if the request is likely to result in a more reliable transmission path, even a registered meter may respond. Accordingly, the meter determines if the new collector offers a potentially more reliable transmission path. For example, the meter 114 may determine if the path to the potential new collector 116 comprises fewer hops than the path to the collector with which the meter is registered. If not, the path may not be more reliable and the meter 114 will not respond to the node scan. The meter 114 might also determine if the RSSI of the node scan packet exceeds an RSSI threshold identified in the node scan information. If so, the new collector may offer a more reliable transmission path for meter data. If not, the transmission path may not be acceptable and the meter may not respond. Additionally, if the reliability of communication between the potential new collector and the repeater that would service the meter meets a threshold established when the repeater was registered with its existing collector, the communication path to the new collector may be more reliable. If the reliability does not exceed this threshold, however, the meter 114 does not respond to the node scan.

If it is determined that the path to the new collector may be better than the path to its existing collector, the meter 114 responds to the node scan. Included in the response is information regarding any nodes for which the particular meter may operate as a repeater. For example, the response might identify the number of nodes for which the meter serves as a repeater.

The collector 116 then determines if it has the capacity to service the meter and any meters for which it operates as a repeater. If not, the collector 116 does not respond to the meter that is attempting to change collectors. If, however, the collector 116 determines that it has capacity to service the meter 114, the collector 116 stores registration information about the meter 114. The collector 116 then transmits a registration command to meter 114. The meter 114 updates its registration data to identify that it is now registered with the new collector. The collector 116 then communicates instructions to the meter 114 to initiate a node scan request. Nodes that are unregistered, or that had previously used meter 114 as a repeater respond to the request to identify themselves to collector 116. The collector registers these nodes as is described above in connection with registering new meters/nodes.

Under some circumstances it may be necessary to change a collector. For example, a collector may be malfunctioning and need to be taken off-line. Accordingly, a new communication path must be provided for collecting meter data from the meters serviced by the particular collector. The process of replacing a collector is performed by broadcasting a message to unregister, usually from a replacement collector, to all of the meters that are registered with the collector that is being removed from service. In one embodiment, registered meters may be programmed to only respond to commands from the collector with which they are registered. Accordingly, the command to unregister may comprise the unique identifier of the collector that is being replaced. In response to the command to unregister, the meters begin to operate as unregistered meters and respond to node scan requests. To allow the unregistered command to propagate through the subnet, when a node receives the command it will not unregister immediately, but rather remain registered for a defined period, which may be referred to as the "Time to Live." During this time to live period, the nodes continue to respond to application layer and immediate retries allowing the unregistration command to propagate to all nodes in the subnet. Ultimately, the meters register with the replacement collector using the procedure described above.

One of collector's 116 main responsibilities within subnet 120 is to retrieve metering data from meters 114. In one embodiment, collector 116 has as a goal to obtain at least one successful read of the metering data per day from each node in its subnet. Collector 116 attempts to retrieve the data from all nodes in its subnet 120 at a configurable periodicity. For example, collector 116 may be configured to attempt to retrieve metering data from meters 114 in its subnet 120 once every 4 hours. In greater detail, in one embodiment, the data collection process begins with the collector 116 identifying one of the meters 114 in its subnet 120. For example, collector 116 may review a list of registered nodes and identify one for reading. The collector 116 then communicates a command to the particular meter 114 that it forward its metering data to the collector 116. If the meter reading is successful and the data is received at collector 116, the collector 116 determines if there are other meters that have not been read during the present reading session. If so, processing continues. However, if all of the meters 114 in subnet 120 have been read, the collector waits a defined length of time, such as, for example, 4 hours, before attempting another read.

If during a read of a particular meter, the meter data is not received at collector 116, the collector 116 begins a retry procedure wherein it attempts to retry the data read from the particular meter. Collector 116 continues to attempt to read the data from the node until either the data is read or the next subnet reading takes place. In an embodiment, collector 116 attempts to read the data every 60 minutes. Thus, wherein a subnet reading is taken every 4 hours, collector 116 may issue three retries between subnet readings.

Figure 4:
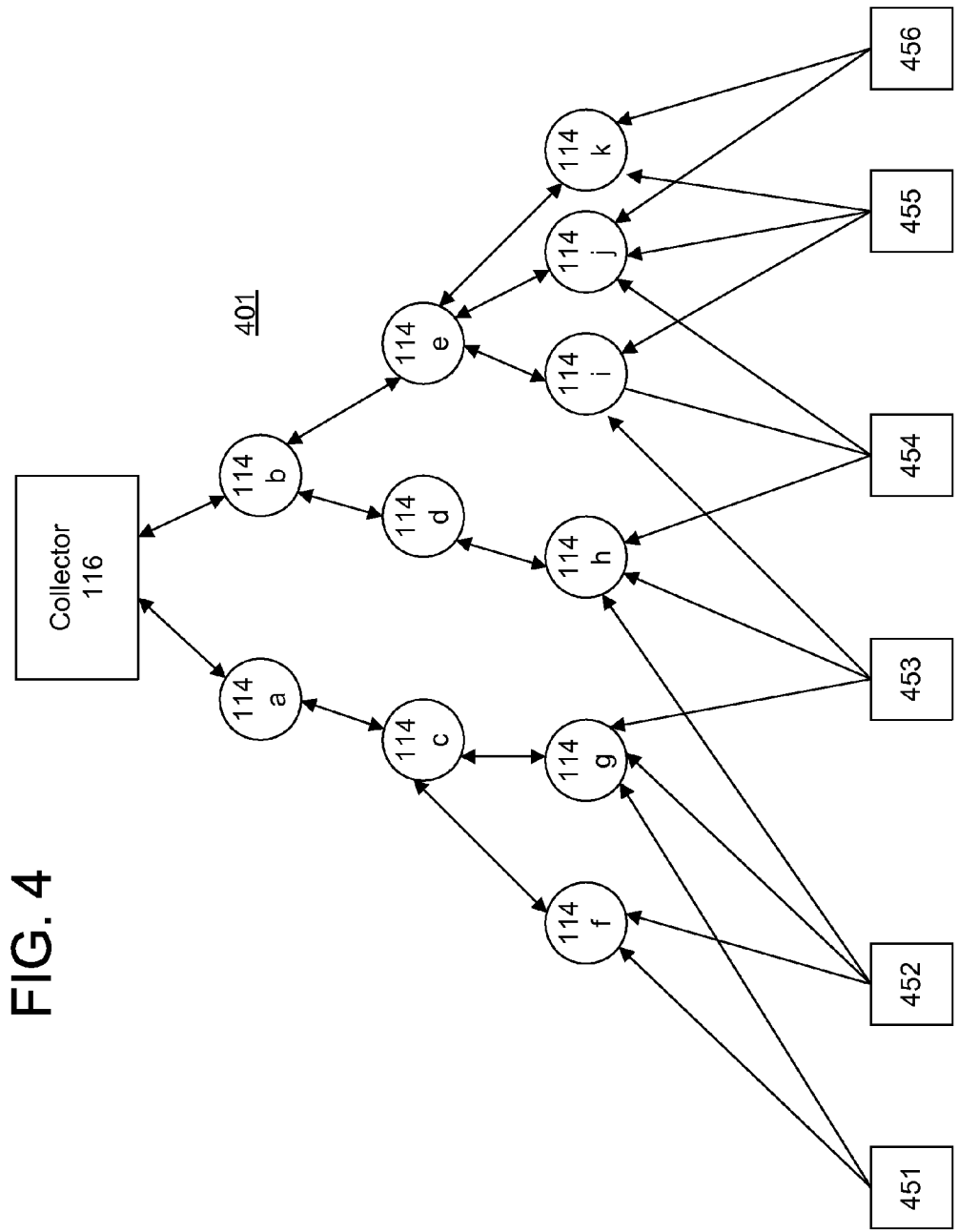
FIG. 4 is a diagram of an example subnet of a wireless network for collecting data from remote devices.

Meters 114 are often two-way meters—i.e. they are operable to both receive and transmit data. However, one-way meters that are operable only to transmit and not receive data may also be deployed. FIG. 4 is a block diagram illustrating a subnet 401 that includes a number of one-way meters 451-456. As shown, meters 114a-k are two-way devices. In this example, the two-way meters 114a-k operate in the exemplary manner described above, such that each meter has a communication path to the collector 116 that is either a direct path (e.g., meters 114a and 114b have a direct path to the collector 116) or an indirect path through one or more intermediate meters that serve as repeaters. For example, meter 114h has a path to the collector through, in sequence, intermediate meters 114d and 114b. In this example embodiment, when a one-way meter (e.g., meter 451) broadcasts its usage data, the data may be received at one or more two-way meters that are in proximity to the one-way meter (e.g., two-way meters 114f and 114g). In one embodiment, the data from the one-way meter is stored in each two-way meter that receives it, and the data is designated in those two-way meters as having been received from the one-way meter. At some point, the data from the one-way meter is communicated, by each two-way meter that received it, to the collector 116. For example, when the collector reads the two-way meter data, it recognizes the existence of meter data from the one-way meter and reads it as well. After the data from the one-way meter has been read, it is removed from memory.

While the collection of data from one-way meters by the collector has been described above in the context of a network of two-way meters 114 that operate in the manner described in connection with the embodiments described above, it is understood that the present invention is not limited to the particular form of network established and utilized by the meters 114 to transmit data to the collector. Rather, the present invention may be used in the context of any network topology in which a plurality of two-way communication nodes are capable of transmitting data and of having that data propagated through the network of nodes to the collector.

According to various embodiments, the capabilities of a mobile interrogator can be enhanced. As a result, the performance of both fixed and mobile networks can be improved. In addition, a hybrid system can be realized that provides a utility company with advantages of both fixed and mobile networks.

In one embodiment, a mobile interrogator can be used to improve the performance and reliability of mobile, fixed, and hybrid meter reading and utility networks. A fixed network typically has a tree structure with endpoint devices or units at the extreme ends of the tree. These endpoint devices relay their data toward a central head end by passing data first through a local area network (LAN) that includes other endpoint devices, repeaters, and collectors, and then through a wide area network (WAN) to the head end. Many of the endpoint devices or units, such as electric meters, are always on. Other endpoint devices or units, however, are battery operated, such as sleepy gas, water, and in-home modules. Such devices use a periodic wake up methodology in order to tie into the network. This periodic wake up process can be unilateral at the discretion of the endpoint or the result of some wake up process initiated by adjacent always-on devices.

Figure 5:
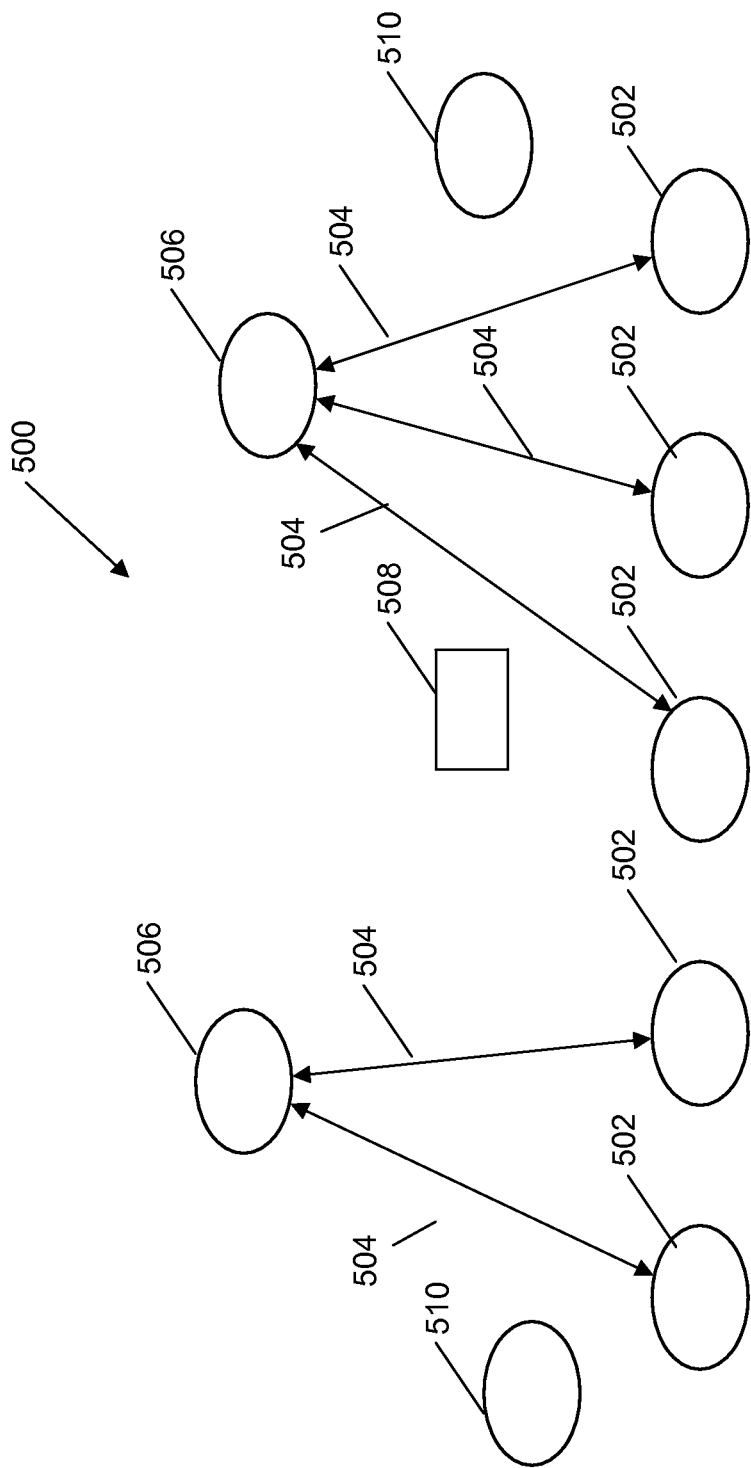
FIG. 5 is a diagram of an example system for hybrid employment of fixed network and mobile network communications according to an embodiment.

FIG. 5 illustrates an example system 500 for hybrid employment of fixed network and mobile network communications according to an embodiment. The system 500 includes a plurality of communication nodes, some of which are fixed network mode devices 502 and others of which are mobile mode devices 510. As set forth above, the fixed network mode devices 502 may include, for example, any combination of meters, repeaters, collectors, gateways and other devices. As also set forth above, the fixed network mode devices 502 may communicate using one or more fixed wireless network communication protocols, such as, for example, a local area network (LAN) protocol and/or a wide area network (WAN) protocol. The fixed network mode devices 502 may also communicate using respective fixed transmission paths 504 and may employ, for example, Advanced Metering Infrastructure (AMI) techniques.

At least some other of the communication nodes are mobile mode devices 510 that operate in a mobile mode in which they transmit meter data to a mobile device 508, such as a mobile interrogator device, using one or more mobile communication protocols. These mobile mode devices 510 may, for example, communicate using Automatic Meter Reading (AMR) techniques.

According to some exemplary embodiments, in addition to communicating with mobile mode devices 510, the mobile device 508 may communicate with one or more fixed network mode devices 502 using one or more fixed network communication protocols. The mobile device 508 may be referred to as a hybrid mobile interrogator device because it can be used to implement a hybrid network that combines features of fixed networks and mobile networks. Such a hybrid mobile interrogator may provide a number of advantages in connection with both traditional fixed and mobile systems as will be described in detail below.

One challenge for a fixed network is maintaining the underlying, backbone communication system, especially in times of outages, maintenance, equipment failures or fluctuating network topologies. These situations may cause loss of data at the local nodes and disrupt the communication paths, so that downstream data is prevented from reaching the head end. Accordingly, in times of stress (e.g., power outages) when the backbone communication system is most critically needed, the backbone communication system may be dysfunctional. Data and status from the nodes may have difficulty getting to the head end, and restoration/reconfiguration commands from the head end may not be able to get out to the nodes in need. In these times, and even during normal network reconfiguration (controlled or automated), islands of endpoints may become isolated, or "orphaned," and the utility may lack the information needed to efficiently restore the network.

A hybrid mobile interrogator device that has a variety of local area network (LAN) and wide area network (WAN) communication capabilities can fix or greatly improve these situations. For example, during times of maintenance, when a collector or repeater is not functional or is being serviced, the mobile device 508 can be put in position and can substitute for the collector or repeater and allow the system to operate unaffected by the maintenance. In this function, the mobile device 508 can provide LAN and/or WAN communication channels.

As another example, during route-based data gathering, the mobile device 508 can use wake-up technology and/or passive reception that works for the battery operated endpoints in the fixed network, so that data can be gathered directly. This allows data collection in the absence of the always-on LAN devices (for example, electric meters, repeaters, or collectors).

The mobile device 508 can also be used to gather data from orphaned endpoint devices, including always on and battery operated devices, until the time they reenter the network. To expedite reentry of an orphaned endpoint device into the network, the mobile device 508 can command the orphaned endpoint device to communicate with a more optimal connection point (e.g., a collector or repeater device), rather than waiting for the orphaned endpoint device to make this determination itself.

In some embodiments, the mobile device 508 can provide configuration data to or otherwise control the operation of fixed network mode devices 502. For instance, the mobile device 508 can direct endpoints to disassociate from one collector and move to another collector to balance loading in the network and relieve congestion. The mobile device 508 can also be used to apply configuration and enable encryption and software upgrades to specific regions of a network, which may, for example, require special attention due to, for example, weaknesses in the WAN/LAN, special operating modes, or orphaned meters. As another example, the mobile device 508 can perform encryption key management under the direction of a key manager in the head end. The mobile device 508 can also apply other changes to endpoints, such as performing connect and disconnect operations. When the mobile device 508 gathers data and effects changes, it may keep a log for audit trail purposes, and the log may be encrypted for security and to prevent tampering. In some cases, when the mobile device 508 inserts itself into a fixed network, it may take on the "personality" including, for example, the LAN ID, behavior, and/or encryption method of one or more specific network devices so that the mobile device 508 is allowed to participate in the network.

The mobile device 508 can also aid in understanding and troubleshooting the performance of a fixed network by, for example, gathering connectivity data from endpoints and determining which endpoints have contact with which other endpoints. If certain nodes are having communication issues, the mobile device 508 can travel a route surrounding the nodes and determine, for example, the RF signal quality and/or connectivity of the nodes in question by, for example, pinging them and measuring RF signal strength, e.g., a Received Signal Strength Indicator (RSSI) value. In doing so, the mobile device 508 can determine why a node may be orphaned or have poor connectivity.

While some of the advantages of a "hybrid" mobile device in fixed networks are described above, such a device also offers advantages over traditional mobile systems. A mobile system can be drive-by, fly-by, or walk-by in nature. In a mobile system, a mobile interrogator, such as the mobile device 508 of FIG. 5, travels a predetermined route, for example, once a month in order to gather data from and, if possible, issue commands to endpoint devices in residential and commercial locations. These endpoint devices may include, for example, water, gas, and electric metering and control devices (e.g., thermostats, and load control). There is typically little or no communication between the endpoint devices themselves, and each endpoint device may maintain its own history of data for a period, such as the past month. In some embodiments, the mobile device 508 may use a wake-up signal to wake up the endpoint devices for the communication exchange. Alternatively, the endpoint devices may unilaterally transmit their data periodically (e.g., every few seconds), so that it can be heard by the mobile device 508 whenever it travels by. The collected data is eventually passed from the mobile device 508, to a route manager, and then up to a head end that interfaces to the utility billing system.

One challenge for mobile systems is the time it takes to gather the information from the endpoint devices. The time that is required to travel all of the geographically diverse routes increases the quantity and cost of the resources, both in terms of people and equipment, that are required to gather the data. Travel speed can be increased and travel time decreased if, for example, the number of endpoint devices or modules that need to be woken up decreases. Travel time can also be decreased if the number of always-on devices that need to be contacted decreases. Travel speed can be increased if data exchanges are performed more efficiently, for example, by working with consolidated or processed data.

The capabilities of a mobile network can be increased if it contains endpoint devices that have store and forward and time management features, which are traditionally associated with fixed network devices. These devices can be used as described herein to speed data collection by the mobile device 508, but can also supply day-to-day time management, corrections, and restoration in between periodic (e.g., monthly) visits by the mobile device 508. Such devices do not need to be part of every endpoint or throughout the network. Rather, they can be distributed at critical locations where higher performance is needed.

In some embodiments, the mobile device 508, such as a hybrid mobile interrogator, can improve travel speeds and decrease travel time by taking advantage of the fixed network type devices that are deployed in a mobile network. For example, the mobile device 508 may communicate directly with always-on devices, such as electric meters, repeaters, and collectors, using the necessary LAN and/or WAN protocol. The mobile device 508 can also read either data pertaining either to a particular local device or data pertaining to downstream devices that is being relayed, including, for example, sleepy devices and other always-on devices. The mobile device 508 may exercise a preference for communication with always-on devices, which hold relay data for the sleepy devices. Such a preference may be desirable because the always-on devices do not require a time-consuming wake-up process. In some embodiments, the mobile device 508 may communicate directly with collectors and may gather the data that has been consolidated from downstream devices and partially processed. The mobile device 508 may also apply algorithms that consider consolidated data collected from the always-on endpoint devices, repeaters, and collectors. In this way, the mobile device 508 can reduce the number of standalone endpoint devices that still need to be traveled to.

Accordingly, rather than having to contact each endpoint, the mobile device 508 may only contact the endpoints that are not already present in the consolidated data. This may reduce the time required for multiple wake ups and exchanges, and travel to diverse locations. The remaining route can be adjusted in real time to target only the "missing" nodes that need to be contacted individually.

Figure 6:
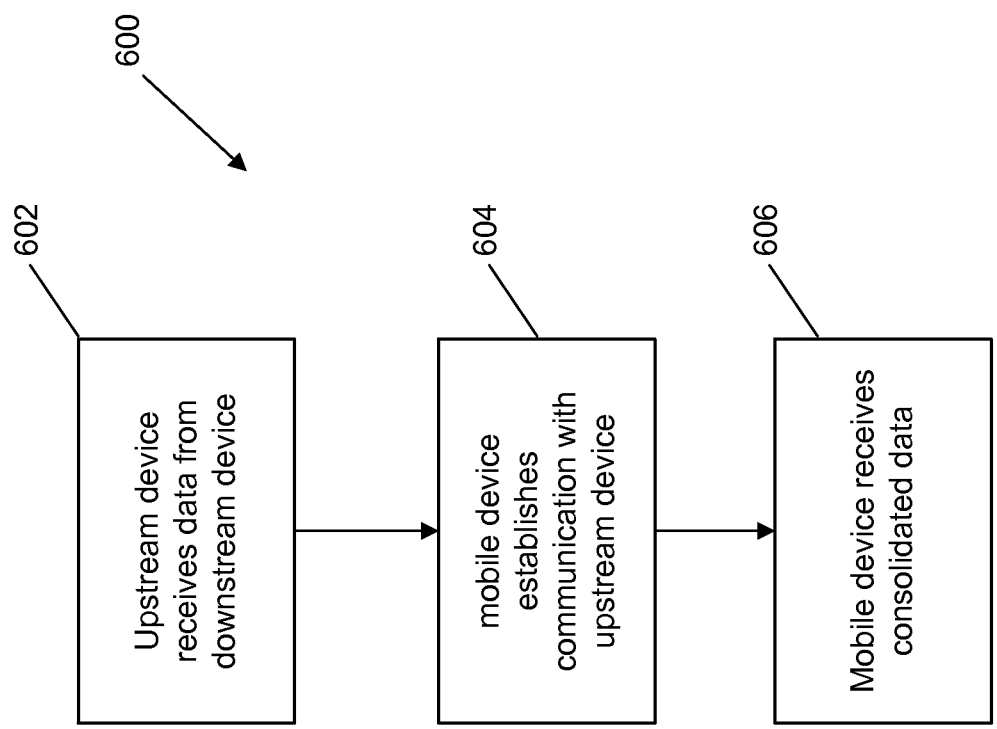
FIG. 6 is a process flow diagram illustrating an example method for consolidated data collection.

FIG. 6 is a process flow diagram illustrating an example method 600 for consolidated data collection. At act 602, an upstream device receives data from a downstream device. The upstream device may be, for example, an always-on device such as an electric meter, repeater or collector. The downstream device may be, for example, a battery powered device such as a water or gas meter. The data received from the downstream device may include, for example, metering data from the downstream device. At act 604, a mobile device establishes communication with the upstream device, and, at act 606, the mobile device receives consolidated data. The consolidated data may include local data from the upstream device along with the additional data received from the downstream device at act 602. Thus, for example, the mobile device is able to receive consolidated data associated with both the upstream device and the downstream device without the need to establish direct communication with the downstream device.

Using a mobile interrogator device can realize a number of enhancements to both fixed and mobile networks. For example, when gathering data, the mobile interrogator device can have a variety of communication paths in the upstream and downstream directions, to allow real time data and status reporting associated with both LAN communication and WAN communication. With respect to WAN communication, both the established WAN method used by the meter network and independent, more reliable back-up communication paths can be employed.

During a WAN, LAN, or electrical outage in a fixed or mobile network the mobile interrogator device can be sent out on routes to communicate with endpoint devices of interest, and, in doing so, collect outage and restoration data in specific areas of concern. Data can be gathered to produce outage and restoration reports so repair teams can be applied quickly and efficiently.

In addition to the fixed network and mobile modes described above, network nodes may also operate in a hybrid mode in which they may be capable of performing both fixed network and mobile communications. It should also be noted that, in some cases, either or both of the fixed network and mobile modes may provide this hybrid capability themselves without the need to formally switch to a separate "hybrid" mode of operation. Furthermore, the mobile interrogator device can command nodes to switch between different network modes of operation, e.g., fixed, mobile, and hybrid modes. This may be beneficial, for example, when the utility company evolves the desired behavior of a network and the nodes in a network.

Accordingly, using a hybrid mobile interrogator device may allow utility companies to blur the boundaries of fixed and mobile networks and selectively operate their network in fixed, mobile, or both modes simultaneously. This may allow advantageous performance and reliability compared to networks that have to operate in either a purely fixed mode or a purely mobile mode.

As set forth above, mobile interrogators, such as the mobile device 508 of FIG. 5, are traditionally used in Automatic Meter Reading (AMR) utility networks to gather very basic information such as monthly consumption. By contrast, fixed Advanced Metering Infrastructure (AMI) networks typically offer more information, but do not traditionally employ mobile interrogators. According to various embodiments disclosed herein, the additional information provided by an AMI system, as well as other additional information, may be provided to a mobile interrogator. Furthermore, this additional information may be conveyed using enhanced user interface features that may be implemented in a mobile interrogator. These enhanced user interface features may enhance an operator's ability to manage and interrogate endpoints in both AMR and AMI and other networks. The enhanced user interface features may, for example, convey information using various colors, shapes, and sounds. Touch input can be also be used to perform various functions as set forth below.

Figure 7:
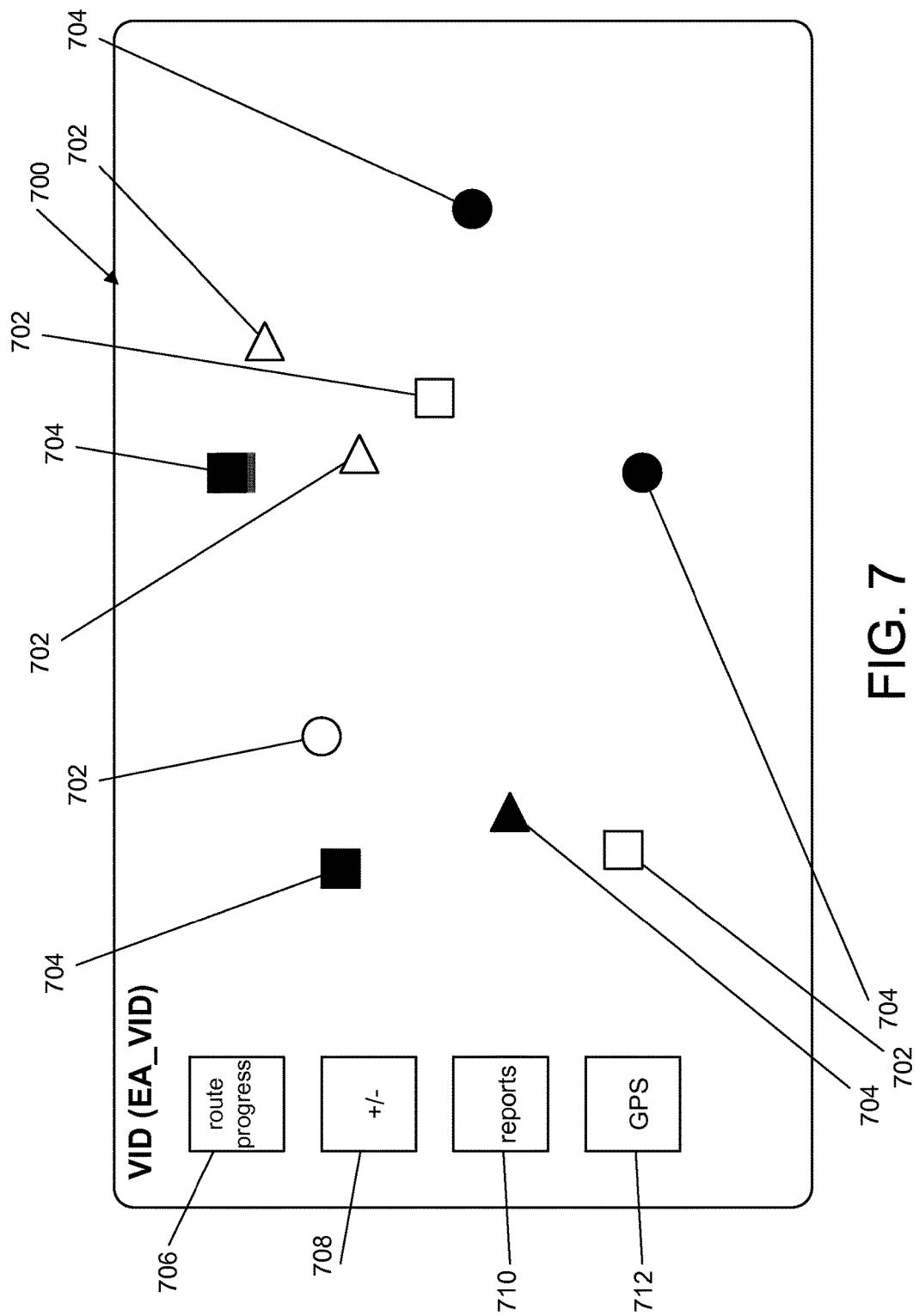
FIG. 7 is a diagram illustrating an example user interface for a mobile data collection device.

FIG. 7 depicts an example user interface 700 that may incorporate a number of improvements. The user interface 700 may be presented on a display of the mobile device 508 of FIG. 5 and may include a visual representation of nodes in a network. The visual representation may incorporate different visual indicators, such as different colors, shapes, or icons, to indicate different types of nodes, different states of nodes, and/or different read types associated with nodes. These visual indicators may be superimposed on a street map, which is not depicted in FIG. 7. The user interface 700 may also include audio and/or visual warnings and status display messages. Further, the user interface 700 may incorporate a touch sensitive component. For instance, as shown in FIG. 7, the user interface 700 may use one or more on-screen buttons to allow the user to generate a variety of different reports or to access control or configuration options. In addition, the user interface 700 may allow the user to use touch to change the shape and size of a search window or to select devices to include or exclude from a route.

The user interface 700 may use different colors, shapes, or icons to indicate different types of devices. For example, blue shapes or icons 702 (depicted as white in FIG. 7) may be used to indicate water meters, red shapes or icons 704 (depicted as black in FIG. 7) may be used to indicate electric meters, and brown or black shapes or icons may be used to indicate gas meters. Other colors, shapes, or icons can be used to indicate other types of devices, such as, for example, transformer monitors, repeaters, and gateways.

Different shapes, sizes, icons, or colors can be used to indicate different states. For instance, one shape, e.g., a triangle, may be used to indicate that a meter is unread, while another shape, e.g., a square, may indicate that the meter has been read. Still another shape, e.g., a circle, may indicate that a read attempt has failed. Yet another shape may indicate whether a meter is connected or disconnected. Still other indicators may be used to indicate status flags, error flags, process errors (e.g., disconnect failed, demand reset failed, etc.), load side voltage, low battery, tampering, etc.

In some embodiments, the user interface 700 may indicate different read types associated with an endpoint device, including, for example, a history read, a standard read, a request for a demand reset, a connect or disconnect request, or other special read types. These and other read types may be represented using different colors, shapes, or icons. The user interface 700 may also indicate a "verify read" error, in which the visual read by the operator is inconsistent with the RF read by the mobile interrogator device. Further, the user interface 700 may indicate meters that appear to be stolen or improperly located or out of place.

In addition to using different shapes, icons, and/or colors, the user interface 700 may incorporate audio and/or visual warnings and status display messages to, for example, assist the user in adjusting the speed and/or direction of the vehicle for proper meter operation. For instance, a warning may be used to advise the user to pull the vehicle over to perform a connect or disconnect operation. A status display message may be used to advise the user that it is acceptable to drive faster because (1) the read rate exceeds preset threshold and the user is not speeding, or (2) there are no meters in the window and the user is not speeding. On the other hand, a warning may be used to prompt the user to drive more slowly, either because the read rate is lower than preset acceptable threshold or because the user is exceeding a speed limit that is set by an operator or by law. A warning or status message may be used to warn the user to be prepared to slow down because the user is entering an area of high density or because the user is approaching meters that may require more time to read or that may require the vehicle to be pulled over, such as an electric connect/disconnect, demand reset, etc. In some embodiments, a warning or status message may be used to prompt the user to turn around because the user missed a read on a meter or because the user is prematurely leaving a geographic area that is associated with the route. Audio warnings may indicate process errors, such as a missing meter or errors encountered during attempts to perform a connect or disconnect operation or communicate with a meter.

In some embodiments, the user interface 700 may incorporate a touch sensitive component. For instance, as shown in FIG. 7, the user interface 700 may use one or more on-screen buttons to allow the user to generate a variety of different reports or to access control or configuration options. As a non-limiting example, an on-screen button 706 may cause the display to show the user's progress along the route. Another on-screen button 708 may allow the user to zoom in or out of the map or relocate the map. Yet another on-screen button 710 may allow the user to generate any of a variety of reports. Still another on-screen button 712 may allow the user to access global positioning system (GPS) functions.

In some embodiments, a mobile interrogation system may be capable of interrogating and managing both AMR and AMI utility networks and other networks. Certain other features may improve mobile interrogation of both AMR and AMI utility networks and other networks. For example, mobile interrogation may be improved by optimized route navigation. Typically, mobile endpoint interrogation in AMR or AMI utility networks is performed by route assignment to a mobile system. The route is generated using route management software, and endpoints are included based on a set of utility criteria. The route typically includes the address and geospatial data collected during endpoint installation. Once the route is generated, traditionally the operator must determine how to optimally traverse the route.

Mobile interrogation may be improved by a route navigation feature that determines a more efficient or optimum interrogation route to traverse for the operator. The user may input meter route preference criteria (for example, fastest time, fewest miles, avoid congested areas, and/or avoid tolls) and endpoint meter attribute filters (for example, outage meters, service connect, service disconnect, demand reset, and/or verify read). An optimized route generation algorithm may be applied to, for example, the user preferences, meter route preference criteria, meter endpoint attribute filters, historical endpoint results and GPS data. The result may be a turn-by-turn or other detailed driving plan that directs the mobile interrogator through the route to gather data from the specific target endpoints. If desired, this more efficient route may change for each new data collection operation.

Figure 8:
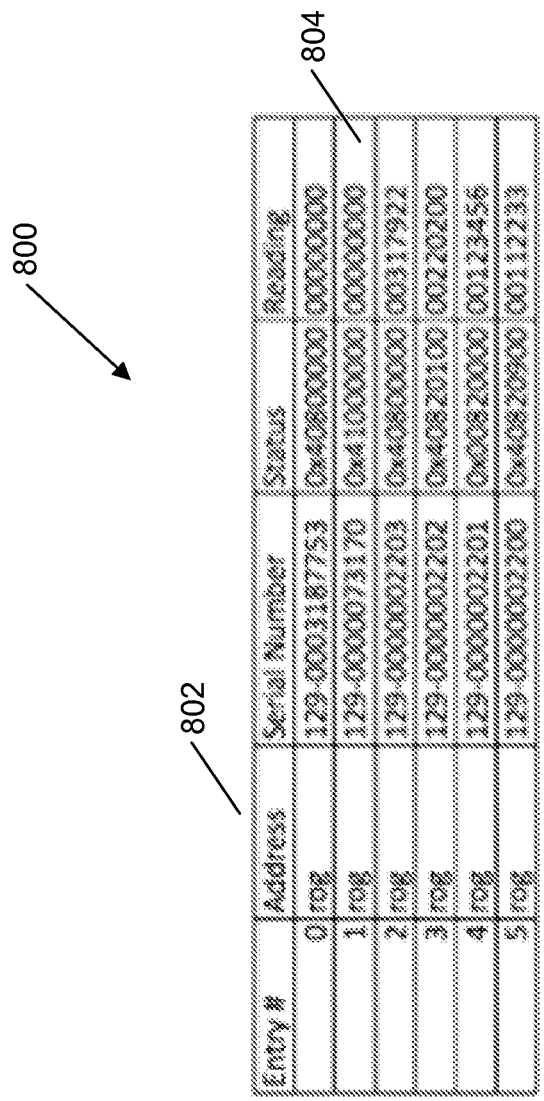
FIG. 8 is a diagram illustrating an example user interface for collecting data from endpoint devices identified by their serial number and encoded status information.
Figure 9:
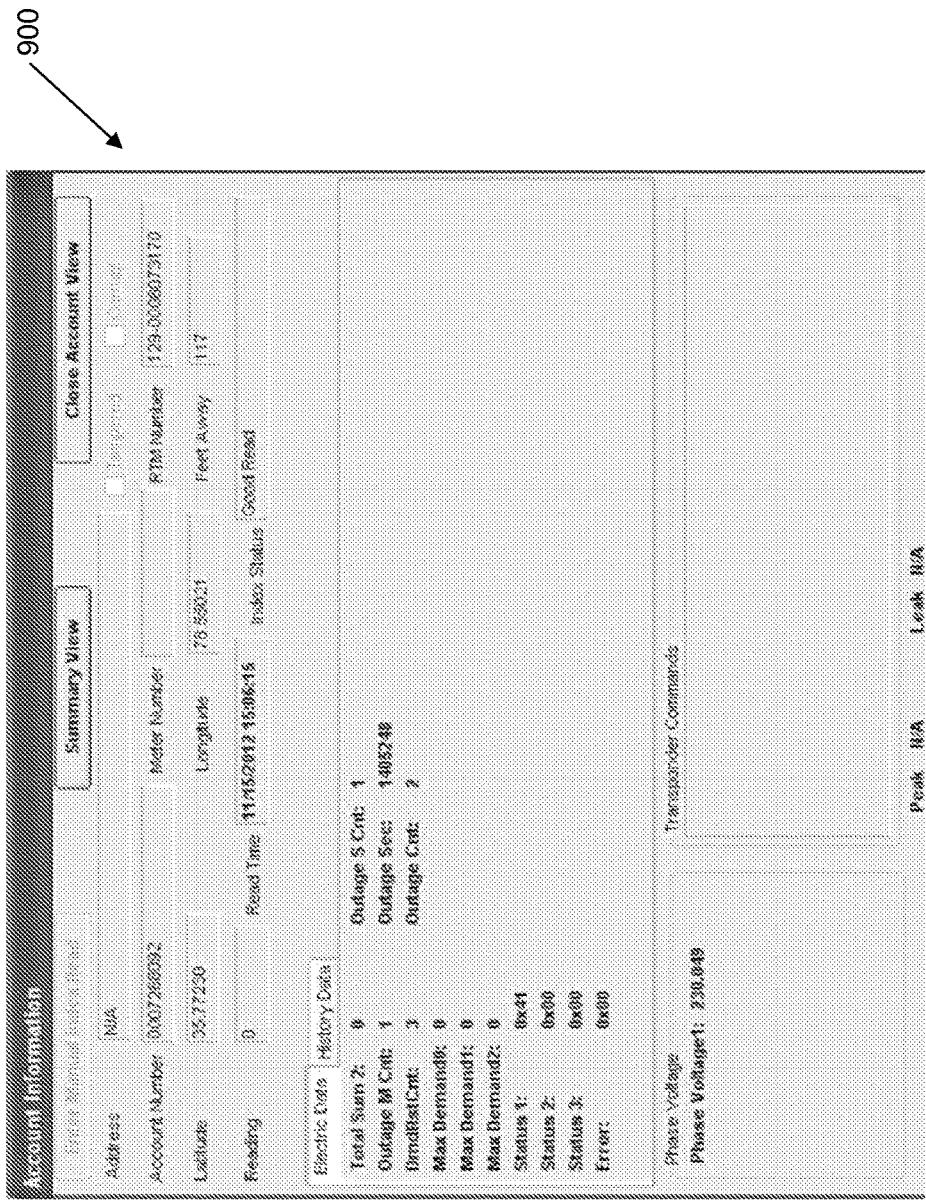
FIG. 9 is a diagram illustrating an example user interface for displaying geographic and other data associated with a particular endpoint device.
Figure 10:
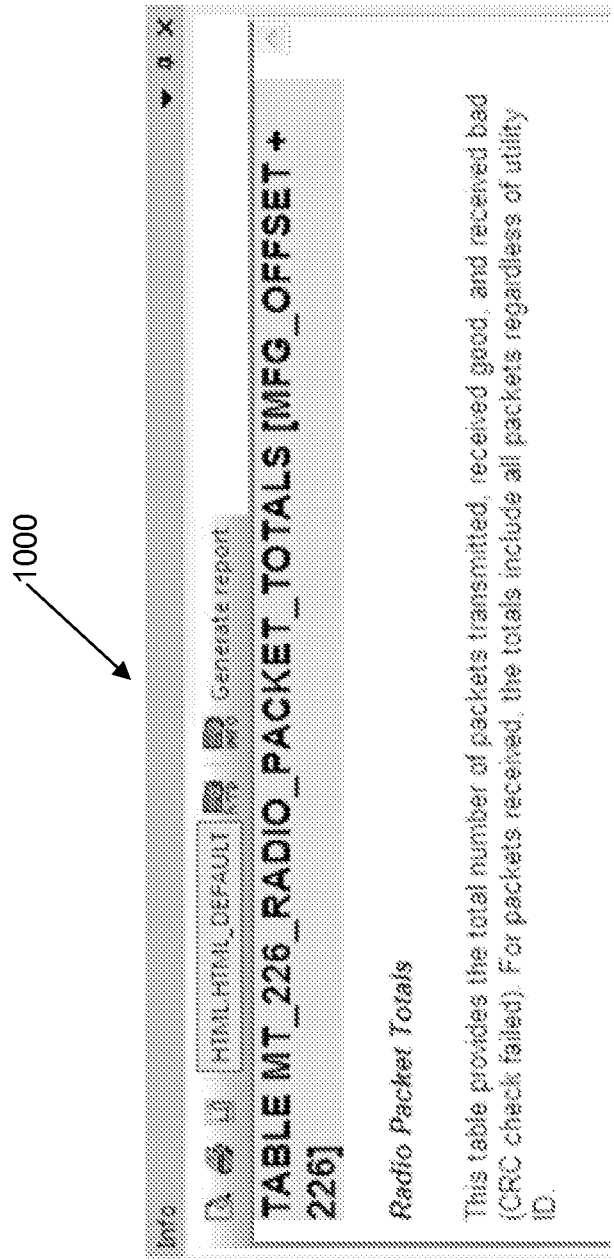
FIG. 10 is a diagram illustrating an example user interface for displaying packet performance and other data associated with a particular endpoint device.

The route navigation feature may be based on additional data, such as, for example, data that is specific to each endpoint device. This data may be uniquely identified and may supply information about attributes such as, for example, radio performance and geographical location related to this optimization. In particular, FIG. 8 is a diagram illustrating an example user interface 800 for collecting data from endpoint devices identified by their serial number and encoded status information. The user interface 800 may include a number of columns 802 indicating, for example, an address, a serial number, encoded status information, and a reading associated with individual entries, which are represented in rows 804 of the user interface. FIG. 9 is a diagram illustrating an example user interface 900 for displaying geographic and other data associated with a particular endpoint device. The user interface 900 may display, for example, account information associated with the endpoint device, as well as historical data. FIG. 10 is a diagram illustrating an example user interface 1000 for displaying packet performance and other data associated with a particular endpoint device. This information may be displayed, for example, as a table that shows the total number of packets transmitted, received good, and received bad, e.g., with a failed CRC check. For packets received, the totals may include all packets regardless of the utility identifier.

As another example, mobile interrogation may be improved by an adaptive transmitter control feature that may extend the battery life of battery operated endpoint devices. Historically, battery operated gas and water modules that require a wakeup signal are subjected to the wakeup signal continuously during route interrogation even when no modules are currently under interrogation. The result of the current practice is shortened battery life of the battery-powered gas and water modules and increased power demand on the data collection vehicle.

The adaptive transmitter control feature may extend module battery life by, for example, turning off the wakeup transmitter when the mobile interrogator determines that it is stopped and/or that no endpoints needing interrogation are included within the interrogation window. In some cases, other factors may also be considered such as the duration for which mobile interrogator is stopped and also the proximity of endpoints needing interrogation outside the interrogation window. For example, if the mobile interrogator is only stopped briefly (e.g., stop sign or red light), then the transmitter may remain on. Also, if there are endpoints needing interrogation just outside the window, then, in some cases, the transmitter may also remain on. These determinations may be made based on, for example, GPS data. The mobile interrogator may use, for example, an extended interrogation window area, the speed and direction the mobile interrogator is traveling, and the time required to turn on the transmitter to ensure the endpoint devices under interrogation will be awake as they enter the window, while minimizing endpoint wakeup signal exposure.

In some embodiments, the mobile interrogation may be enhanced by controlling additional meter functions. These may, for example, include some functions that may have typically been previously performed only on fixed AMI networks. Historically, mobile interrogation of endpoint devices in AMR and AMI networks consists of gathering very basic consumption information. The mobile device 508 according to the disclosed embodiments may control a number of advanced gas, water, and electric meter functions, such as demand resets and gas, water, and electric service disconnect and connect operations for internal and external switches. The mobile device 508 may also perform meter configuration of non-networked endpoint devices. The mobile device 508 may change the operating mode of various devices between drive-by, hybrid, and fixed network modes. For electric meters, the mobile device 508 may collect data pertaining to delivered power and supplied power, perform transformer monitoring, and/or generate or use load profiles. Various readings, including voltage, current, VAR, VA, and real power readings, may be performed. The mobile device 508 may also perform net metering. In addition, the mobile device 508 may control time of use or time of use schedules. Various synchronization operations may be performed. For example, the mobile device 508 may provide clock synchronization between a mobile network and a fixed network, or between an endpoint device's clock and a mobile network's clock. Outage calculations may be performed based on an endpoint device's internal clock.

In some embodiments, the mobile device 508 may incorporate a meter performance trending function that uses historical endpoint interrogation data to report potential problems with endpoint devices to the operator. This may be accomplished, for example, by recording the reception range, response rate and other readings between the mobile device 508 and each endpoint device. Algorithms may then be applied to discover issues, such as gas and water endpoints approaching battery end-of-life and electric meter malfunction.

The mobile device 508 may incorporate an adaptive display resynchronization feature that allows the operator to hot swap a failed video display device with a functioning video display device without restarting the mobile device 508.

In some embodiments, the mobile device 508 may have the capability to determine whether a meter has been stolen and, if so, to attempt to locate it within the utility's network. For example, the mobile device 508 may use historical Received Signal Strength Indicator (RSSI) and read location data to infer unauthorized meter movement relative to current interrogation data. Further, historical read history data may indicate that a user-supplied threshold of "no reading" has occurred.

Once it is determined that a meter has been stolen, the mobile device 508 may attempt to determine the location of the meter. The missing meter may be included in the utility company's routes without geospatial location data. When the mobile device 508 receives a response from the stolen meter, the user can gather RSSI data for non-real time data processing using a matrix of the RSSI data to predict where the meter is located. Alternatively, the mobile device 508 can guide the user progressively closer to the missing meter location by attempting to maximize the RSSI value in the response.

In some embodiments, mobile interrogation may be enhanced by encrypting communications and managing endpoint encryption. For example, the mobile device 508 may enable or disable encrypted endpoint communication. Endpoint encryption keys may be updated. Stranded fixed network endpoint devices may be rekeyed. Mobile network key management methods may be synchronized with overlapping fixed networks to achieve a standard level of security across the network. The mobile device 508 may provide key management for a mobile-only network. In addition, the mobile device 508 may enable utility rekeying in mobile, fixed and blended (AMR/AMI) networks.

In some embodiments, mobile interrogation data may be used to create outage and restoration maps and present them graphically in real-time or at other time intervals. The map's background colors may highlight areas of outage and restoration to easily guide restoration crews during an outage.

All or portions of the subject matter disclosed herein may be embodied in hardware, software, or a combination of both. When embodied in software, the methods and apparatus of the subject matter disclosed herein, or certain aspects or portions thereof, may be embodied in the form of program code (e.g., computer executable instructions). This program code may be stored on a computer-readable medium, such as a magnetic, electrical, or optical storage medium, including without limitation, a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A device on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language. When implemented on a general-purpose processor, the program code may combine with the processor to provide a unique apparatus that operates analogously to specific logic circuits.

While systems and methods have been described and illustrated with reference to specific embodiments, those skilled in the art will recognize that modification and variations may be made without departing from the principles described above and set forth in the following claims. Accordingly, reference should be made to the following claims as describing the scope of the present invention.

What is claimed is:

1. A system for hybrid employment of fixed network and mobile network communications for utility meter data collection, the system comprising:
   a plurality of communication nodes, at least some of the communication nodes operating in a fixed network mode in accordance with advanced metering infrastructure (AMI) system techniques using one or more fixed wireless network communication protocols, and at least some other of the communication nodes operating in a mobile mode in which they transmit meter data to a mobile collection device in accordance with automated meter reading (AMR) system techniques using one or more mobile communication protocols; and
   the mobile collection device configured to communicate with the at least some other of the communication nodes operating in the mobile mode using the one or more mobile communication protocols, the mobile collection device further configured to communicate with the at least some of the communication nodes operating in the fixed network mode using the one or more fixed wireless network communication protocols, wherein the mobile collection device substitutes for a fixed network collection device when the fixed network collection device is down for maintenance or is otherwise not operable, and wherein the mobile collection device takes on a network identifier and an encryption method of the fixed network collection device.

2. The system of claim 1, wherein the one or more fixed wireless network communication protocols comprise one or more local area network (LAN) communication protocols and one or more wide area network (WAN) communication protocols.

3. The system of claim 1, wherein the mobile collection device substitutes for a fixed network collector or repeater when that collector or repeater is down for maintenance or is otherwise not operable.

4. The system of claim 1, wherein the mobile collection device sends commands to the at least some of the communication nodes operating in the fixed network mode, wherein the commands comprise at least one of a command to disassociate from one collector and move to another collector, configuration commands, commands to switch between the mobile mode and the fixed network mode or commands for software updates.

5. The system of claim 1, wherein at least some of the communications nodes operate in a hybrid communication mode in which they perform both fixed wireless network communications and mobile communications using the one or more mobile communication protocols.

6. The system of claim 1, wherein the mobile collection device communicates with a first fixed network mode communication node to collect consolidated data collected from another communication node by the first fixed network communication node.

7. The system of claim 1, wherein the mobile collection device comprises a user interface that employs different audio and/or visual indicators to provide information.

8. The system of claim 1, wherein the mobile collection device traverses at least some of the plurality of communication nodes using a route generated in accordance with meter route preference criteria and meter attribute filters.

* * * * *